US012503937B1

(12) United States Patent
Orbell et al.

(10) Patent No.: US 12,503,937 B1
(45) Date of Patent: Dec. 23, 2025

(54) AUTONOMOUS DRILLING SYSTEM WITH INTEGRATED AI

(71) Applicant: ADS Services LLC, Midland, TX (US)

(72) Inventors: Charles Orbell, Houston, TX (US); Brian Ellis, Magnolia, TX (US)

(73) Assignee: ADS Services, LLC, Midland, TX (US)

( * ) Notice: Subject to any disclaimer, the term of this patent is extended or adjusted under 35 U.S.C. 154(b) by 0 days.

(21) Appl. No.: 18/813,606

(22) Filed: Aug. 23, 2024

(51) Int. Cl.
*E21B 44/00* (2006.01)

(52) U.S. Cl.
CPC .......... *E21B 44/00* (2013.01); *E21B 2200/20* (2020.05); *E21B 2200/22* (2020.05)

(58) Field of Classification Search
CPC ... E21B 44/00; E21B 2200/20; E21B 2200/22
See application file for complete search history.

(56) References Cited

U.S. PATENT DOCUMENTS

| | | | | |
|---|---|---|---|---|
| 2002/0120401 | A1* | 8/2002 | Macdonald | E21B 44/005 702/6 |
| 2006/0225515 | A1* | 10/2006 | Ehrler | G05D 7/0635 73/861.57 |
| 2016/0290106 | A1* | 10/2016 | Huang | E21B 21/085 |
| 2018/0245403 | A1* | 8/2018 | Chambers | H02K 7/1823 |
| 2021/0301656 | A1* | 9/2021 | Russell | E21B 49/006 |
| 2022/0003072 | A1* | 1/2022 | Northam | F16K 31/047 |
| 2022/0213781 | A1* | 7/2022 | Parthasarathy | F04D 15/0088 |
| 2022/0290550 | A1* | 9/2022 | Ba | E21B 44/00 |
| 2023/0313678 | A1* | 10/2023 | Saihati | E21B 45/00 175/50 |

OTHER PUBLICATIONS

International Search Report and Written Opinion for Application No. PCT/US2025/042927, mailed on Sep. 29, 2025, 13 pages.

* cited by examiner

*Primary Examiner* — Robert E Fennema
*Assistant Examiner* — Yvonne Trang Follansbee

(57) ABSTRACT

An autonomous drilling system for well construction activities comprises a data acquisition system collecting real-time data from sensors, including flowrate, pressure, and cuttings sensors. A digital twin framework simulates drilling operations and outputs predictions based on the collected data. An AI agent module analyzes the system by aggregating predictions, real-time data, and historical data to determine well health and recommend parameter adjustments. An integrated rig control system automates drilling operations based on these recommendations. A human-machine interface provides manual control options. The system includes flowrate sensors with flow meters, downhole sensors, and multiple digital twins simulating specific aspects of wellbore construction. The AI module can employ deep learning or reinforcement learning techniques. Cuttings sensors analyze volume to assess wellbore stability and hole cleaning efficiency. The system can transition between open and closed loop drilling operations based on AI recommendations.

20 Claims, 9 Drawing Sheets

AUTONOMOUS DRILLING SYSTEM WITH INTEGRATED AI

FIELD

The disclosure relates to drilling systems and methods for well construction activities in the oil, gas, and geothermal industries. More particularly, the disclosure pertains to an autonomous drilling system that integrates artificial intelligence, digital twin technology, and advanced sensor systems to optimize drilling operations, enhance well control, and improve overall drilling efficiency and safety.

BACKGROUND

Drilling operations in the oil, gas, and geothermal industries have traditionally relied on human expertise and manual control systems to manage the complex process of well construction. These operations typically involve a combination of surface equipment, downhole tools, and drilling fluids working in concert to create boreholes that can extend thousands of meters into the earth. Conventional drilling systems utilize various sensors to monitor parameters such as weight on bit, rotary speed, mud flow rate, and downhole pressure, with conventional programming algorithms and/or human operators interpreting this data and making decisions about drilling parameters.

However, the conventional approach to drilling operations faces several challenges. The vast amount of data generated during drilling are not intelligently utilized by conventional programming algorithms and can overwhelm human operators, leading to suboptimal decision-making and increased risk of errors leading to inefficient and sometimes dangerous drilling situations. Additionally, the reliance on human interpretation introduces variability and potential inconsistencies in drilling practices across different wells and operators. Furthermore, the complex interactions between various drilling parameters and subsurface conditions make it difficult for human operators to consistently optimize drilling performance and maintain wellbore stability. These limitations can result in increased non-productive time, higher drilling costs, and potential safety risks.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one aspect, the present disclosure relates to an autonomous drilling system for well construction activities, comprising a data acquisition system configured to collect real-time data, the real-time data comprising drilling parameters from a drilling controller, and sensor data from sensors comprising flowrate sensors measuring an amount of fluid flowing through the drilling system, pressure sensors measuring a pressure of the fluid flowing through the drilling system, and cuttings sensors measuring physical characteristics of cuttings exiting the wellbore as a result of the drilling, a digital twin framework comprising a plurality of drilling models configured to simulate drilling operations based on the collected real-time data, and output predictions for the drilling operations based on the simulation, an artificial intelligence (AI) agent module configured to perform an analysis of the autonomous drilling system by aggregating the predictions from the digital twin framework, analyzing the real-time data, and analyzing historical well data, determine well health based on the analysis, and recommend adjustments to the drilling parameters, an integrated rig control system configured to automate drilling operations based on the recommended adjustments to the drilling parameters, and a human-machine interface configured to provide manual control the drilling operations based on the recommended adjustments to the drilling parameters.

In embodiments of this aspect, the disclosure according to any one of the above example embodiments, the flowrate sensors comprise at least one of a high-pressure flow meter measuring the flow of drilling fluid entering the wellbore and a low-pressure flow meter measuring the flow of drilling fluid exiting the wellbore.

In embodiments of this aspect, the disclosure according to any one of the above example embodiments, the low-pressure flow meter can be configured to measure mass flow rate of the drilling fluid in both open loop and closed loop drilling configurations.

In embodiments of this aspect, the disclosure according to any one of the above example embodiments, the sensors further comprise downhole sensors comprising at least one of pressure sensors, temperature sensors, and vibration sensors.

In embodiments of this aspect, the disclosure according to any one of the above example embodiments, the digital twin framework comprises multiple digital twins, each simulating a specific aspect of a construction process of the wellbore.

In embodiments of this aspect, the disclosure according to any one of the above example embodiments, the specific aspects simulated by the digital twins comprise at least one of drill string dynamics, cuttings circulation, wellbore geometry, and geological formations.

In embodiments of this aspect, the disclosure according to any one of the above example embodiments, the AI agent module employs deep learning or reinforcement learning techniques.

In embodiments of this aspect, the disclosure according to any one of the above example embodiments, the cuttings sensors comprise a cutting weight sensor configured to analyze volume of cuttings from the wellbore.

In embodiments of this aspect, the disclosure according to any one of the above example embodiments, the AI agent module is further configured to use data from the cutting weight sensor to assess wellbore stability and hole cleaning efficiency.

In embodiments of this aspect, the disclosure according to any one of the above example embodiments, the integrated rig control system can be configured to transition between open loop and closed loop drilling operations based on output from the AI agent module.

In one aspect, the present disclosure relates to a method for autonomous drilling of a wellbore, comprising collecting, by a data acquisition system, real-time data comprising drilling parameters from a drilling controller, and sensor data from sensors comprising flowrate sensors measuring an amount of fluid flowing through a drilling system, pressure sensors measuring a pressure of the fluid flowing through the drilling system, and cuttings sensors measuring physical characteristics of cuttings exiting the wellbore as a result of the drilling, simulating, by a digital twin framework comprising a plurality of drilling models, drilling operations based on the collected real-time data, outputting, by the digital twin framework, predictions for the drilling operations based on the simulation, analyzing, by an artificial intelligence (AI) agent module, the autonomous drilling by aggregating the predictions from the digital twin framework, analyzing the real-time data, and analyzing historical well data, determining, by the AI agent module, well health and recommended adjustments to the drilling parameters, automating drilling operations, by an integrated rig control system, based on the recommended adjustments to the drilling parameters, and providing manual control of the drilling operations, by a human-machine interface, based on the recommended adjustments to the drilling parameters.

In embodiments of this aspect, the disclosure according to any one of the above example embodiments, the flowrate sensors comprise at least one of a high-pressure flow meter measuring the flow of drilling fluid entering the wellbore and a low-pressure flow meter measuring the flow of drilling fluid exiting the wellbore.

In embodiments of this aspect, the disclosure according to any one of the above example embodiments, the low-pressure flow meter measures mass flow rate of the drilling fluid in both open loop and closed loop drilling configurations.

In embodiments of this aspect, the disclosure according to any one of the above example embodiments, the sensors further comprise downhole sensors comprising at least one of pressure sensors, temperature sensors, and vibration sensors.

In embodiments of this aspect, the disclosure according to any one of the above example embodiments, the digital twin framework comprises multiple digital twins, each simulating a specific aspect of a construction process of the wellbore.

In embodiments of this aspect, the disclosure according to any one of the above example embodiments, the specific aspects simulated by the digital twins comprise at least one of drill string dynamics, cuttings circulation, wellbore geometry, and geological formations.

In embodiments of this aspect, the disclosure according to any one of the above example embodiments, the AI agent module employs deep learning or reinforcement learning techniques.

In embodiments of this aspect, the disclosure according to any one of the above example embodiments, the cuttings sensors comprise a cutting weight sensor configured to analyze volume of cuttings from the wellbore.

In embodiments of this aspect, the disclosure according to any one of the above example embodiments, further comprising using data from the cutting weight sensor to assess wellbore stability and hole cleaning efficiency by the AI agent module.

In embodiments of this aspect, the disclosure according to any one of the above example embodiments, further comprising transitioning between open loop and closed loop drilling operations using the integrated rig control system based on output from the AI agent module.

BRIEF DESCRIPTION OF THE DRAWINGS

So that the way the above-recited features of the present disclosure can be understood in detail, a more particular description of the disclosure, briefly summarized above, can be made by reference to example embodiments, some of which are illustrated in the appended drawings. It is to be noted, however, that the appended drawings illustrate only example embodiments of this disclosure and are therefore not to be considered limiting of its scope, for the disclosure can admit to other equally effective example embodiments.

DETAILED DESCRIPTION

Figure 1A:
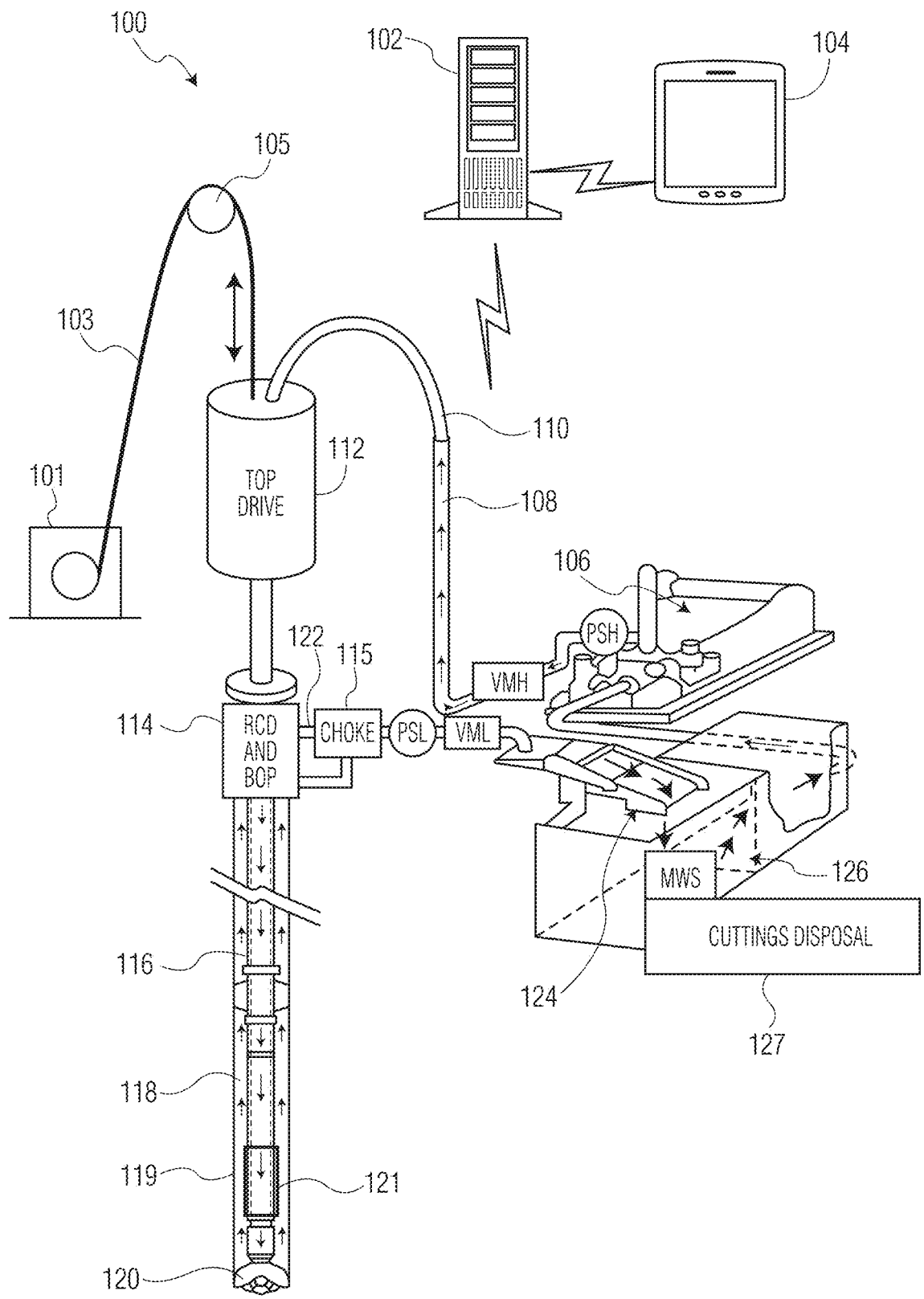
FIG. 1A illustrates a diagram of a drilling rig system, according to aspects of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art cannot be discussed in detail but are intended to be part of the specification where appropriate. In the examples illustrated and discussed herein, any specific values should be interpreted to be illustrative and non-limiting. Thus, other example embodiments can have different values. Notice that similar reference numerals and letters refer to similar items in the following figures, and thus once an item is defined in one figure, it is possible that it need not be further discussed for the following figures. Below, the example embodiments will be described with reference to the accompanying figures.

The following description sets forth examples of the present disclosure. It should be recognized, however, that such description is not intended as a limitation on the scope of the present disclosure. Rather, the description also encompasses combinations and modifications to those examples described herein.

The present disclosure provides an autonomous drilling system designed to optimize well construction operations in the oil, gas, and geothermal industries. This system integrates a data acquisition system, a digital twin framework, an artificial intelligence (AI) agent module, an integrated rig control system, and an optional human-machine interface (HMI).

In some aspects, the autonomous drilling system may include a version of the cloud infrastructure located on-site at the well or rig, enabling local processing and storage capabilities. Additionally, the system may be configured to connect to off-site infrastructure, such as cloud services or other remote systems, to support off-site learning, updates, and modifications to digital twin models and well plans. This hybrid architecture allows for remote work and collaboration while ensuring that the system can operate independently without an internet connection. The ability to function autonomously, without relying on external connectivity, is beneficial for the system's commercial viability and scalability, particularly in remote or challenging environments where internet access may be limited or unreliable.

The data acquisition system can collect real-time data from surface and downhole sensors, including but not limited to flow meters and cutting weight sensors. This data can then be preprocessed to clean, filter, and format it for compatibility with the system.

In one example, the digital twin framework can create sophisticated virtual models of the wellbore and drilling operations. These models can be continuously updated with real-time data, allowing for accurate simulations of various components and scenarios. In some aspects, the system may also collect external data inputs from the rig and external service companies. For instance, the system may incorporate directional drilling data from specialized service providers. This integration of external data sources may enhance the accuracy and comprehensiveness of the digital twin models, potentially enabling more precise simulations and predictions for the drilling operations.

The autonomous drilling system may cover all well construction operations, including drilling, tripping in/out, circulating, reaming, casing/tubing running, and cementing. These operations can be performed using both open and closed loop methods. Closed loop drilling methods may include Managed Pressure Drilling (MPD) and Under Balanced Drilling (UBD) methods. The system is applicable to various types of drilling rigs, including rotary rigs (both land/offshore dry BOP stack rigs and offshore floating rigs with subsea BOPs and drilling risers) and coil tubing rigs (also known as COIL rigs). While the equipment lineups may differ slightly, the technology and methods are applicable to various rig types, ensuring versatility and broad applicability across different well construction scenarios.

In some aspects, the digital twin models within the autonomous drilling system may be designed to continuously generate forward-looking data covering numerous potential scenarios. These models may operate at high speeds locally, leveraging the on-site processing capabilities of the system. By constantly or periodically creating and updating simulations for various possible drilling conditions and outcomes, the system may be able to anticipate and prepare for a wide range of situations in real-time. This approach may enable the AI agent module to make rapid, informed decisions and recommendations, enhancing the system's ability to optimize drilling operations and respond proactively to changing well conditions.

In one example, the AI agent module can analyze the data and use physics models to predict potential issues. It can also integrate the outputs from multiple digital twins to detect complex patterns and interactions. In other words, agents are able to learn from historical data and simulation data which is described in more detail below.

Overall, the integrated rig control system can automate drilling operations based on the output (i.e. recommendations and/or instructions) from the AI agents and the real-time optimization engine. This system can allow for seamless transition between open loop and closed loop drilling configurations, enhancing the system's ability to adapt to changing well conditions without interruption of well construction. The HMI can provide a user-friendly interface for rig operators to monitor real-time data, receive AI output (i.e. recommendations and/or instructions), and manually intervene in the drilling process if desired.

Together, these components work in harmony to continuously monitor and control well conditions, leading to safer, faster, and more efficient well construction. The system's comprehensive well health monitoring capabilities can enable real-time assessment of wellbore stability, fluid dynamics, and formation characteristics. By integrating data from multiple sensors and digital twin simulations, the AI agent module can detect subtle changes in well health indicators, allowing for proactive adjustments to drilling parameters to maintain improved (e.g. optimal) well conditions throughout the construction process.

More specifically, as will be described in more detail, the described system and method leverages cloud-based learning, utilizing a vast historical well data repository to continuously improve machine learning algorithms. Real-time AI-driven optimization can combine live data, physics models, and AI to enhance drilling parameters for safer, more efficient well construction. Digital twin integration can provide real-time simulations of wellbore components, allowing the AI to anticipate and address potential issues proactively.

The system can operate autonomously based on the drilling plan, AI output (i.e. recommendations and/or instructions) while allowing human operators to intervene and maintain control when beneficial. Secure cloud connectivity can ensure safe data transfer between the wellsite and cloud-based learning platform. Safety capabilities can be enhanced through new mass flow meters and mud cutting measurement systems, providing a clearer understanding of well state and potential dysfunctions.

The system can monitor and report on various well dysfunctions, including but not limited to well control events, loss of circulation, stuck pipe, wellbore instability, and drilling vibrations cuttings buildup in the well, and well breathing. It can also identify bit wear and condition using detection of alkene (cracked) gases in return mud. Additionally, the system may monitor and report on other well dysfunctions such as formation fluid influx, differential sticking, and borehole washouts. It also can simplify output for drillers and supervisors using a traffic light system with corresponding output (i.e. recommendations and/or instructions) for action.

The system can continuously monitor both open hole or closed loop pressurized or non-pressurized drilling operations. This can be achieved through various sensors including a return flow venturi-type flow meter, which allows for seamless switching between open and closed hole drilling without loss of data or time. The addition of a high-pressure venturi-type mass flow meter on the input side of the well circulation system can provide a scalable and economic method for continuous mud system input measurement. It is noted that switching between open and closed hole drilling may be based on the drilling plan, manual intervention, AI instructions, AI recommendations or a combination of two or more of the above mechanisms.

The system can also incorporate cuttings measurement system data into digital twin models and AI-supported control systems. This can provide insights into hole conditions, potential collapses, poor cuttings transport/buildup and helps prevent issues like stuck pipe or circulation problems. It can also ensure accurate cement volume calculations for casing operations.

Continuous input of true mass flow into and out of the well in both closed and open systems, combined with cuttings measurements can maintain visibility and control of the well and circulating system. This real-time data can support the operation of the system effectively.

The details of the system will now be described with respect to the figures, which provide visual representations of various components and processes of the autonomous drilling system. These figures illustrate the drilling rig system, flow meters, mud cuttings measurement system, operational processes, network architecture, neural network module, and HMI, offering a comprehensive view of the system's structure and functionality. Through these illustrations, the workings of the autonomous drilling system and its components will be elucidated, providing a clear understanding of how the system optimizes well construction operations (i.e. activities).

Referring to FIG. 1A, the diagram illustrates an example drilling rig system 100 with components on both high-pressure and low-pressure sides of the drilling fluid circulation system. On the high-pressure side, the system can include a mud pump 106, a high-side pressure sensor (PSH), a high-side Venturi meter (VMH), a standpipe 108, and a rotary hose 110. These components are responsible for pumping and monitoring the drilling fluid as it enters the wellbore.

The low-pressure side of the circulation system can include a choke 115, a low-side pressure sensor (PSL), a low-side Venturi meter (VML), a shale shaker 124, and mud tanks 126. These components can handle the drilling fluid as it returns from the wellbore. In some aspects, the mud tanks 126 can include a mud weight sensor (MWS) that measures physical characteristics of the cuttings and cuttings disposal 127 that receives the cuttings from the shale shaker and MWS. This sensor can provide real-time data on properties such weight of the drilling mud and cuttings, enabling continuous monitoring and analysis of the drilling process.

In general, the drilling fluid circulation process begins on the high-pressure side, where the mud pump 106 draws fluid from the mud tanks 126 and pumps it through the high-side pressure sensor PSH and VMH. The fluid then flows through the standpipe 108 and rotary hose 110 into the top drive 112 and downhole. As the fluid returns to the surface, it passes through the RCD and BOP 114 and enters the low-pressure side of the circulation system. In open loop drilling, the RCD may operate without a bearing assembly, effectively open to atmosphere. In closed loop drilling, the RCD may utilize a bearing assembly to create a seal around the drill pipe. In the closed loop configuration, the fluid then flows through a choke 115, which can be used to control the backpressure in the wellbore. After the choke 115, the fluid passes through the low-side pressure sensor PSL and VML, which measure the returning fluid's properties. In the open loop configuration, the choke is bypassed and the fluid flows through the VML. In either case, the fluid then passes over the shale shaker 124, which removes larger cuttings and solids and dumps them onto the MWS for weight monitoring. The cuttings are disposed of in cuttings disposal 127 while cleaned fluid returns to the mud tanks 126, completing the circulation cycle.

In some aspects, the autonomous drilling system may incorporate both MPD and UBD operations as well as traditional well control operations. MPD/UBD operations may utilize a choke to control wellbore pressure during normal drilling activities, while traditional well control operations may employ a separate choke manifold when dealing with more severe influxes or well control events. The system may be designed to seamlessly transition between these operational modes as needed.

In MPD/UBD operations, the return flow may pass through the RCD and then to a dedicated MPD/UBD choke manifold. However, in traditional well control scenarios, at least one of BOP elements may be closed, and the return flow may be directed through a separate well control choke manifold. In some implementations, the system may allow for return flow in a closed system to be routed to a pressure-controlling choke from multiple sources. This may include flow from the RCD, from below the RCD, or from an outlet below a closed BOP sealing element (such as an annular preventer or ram) via lines 122 in FIG. 1A. This flexibility may enable the system to handle a wide range of well control scenarios efficiently.

The fluid continues down the drill pipe 116, passes through down hole measurement sensors 121 until it reaches the bit 120 at the bottom of the wellbore. At this point, the fluid exits through nozzles in the bit, cleaning the cutting surface and cooling the bit. The fluid then carries the drill cuttings up the annular space (well anulus 119) between the drill pipe 116 and the wellbore wall, passing up past the down hole measurement sensors, drill collars 118 and drill pipe 116 towards the surface. In some cases, the system may incorporate Mud Gas Separators (MGS) if there is wellbore gas entrained in the return mud and cuttings flow. The MGS can be used to separate and safely handle any gas present in the drilling fluid before it reaches the shale shakers.

It is noted that the downhole measurement sensors within the drill string may measure conditions in the annulus and wellbore. These sensors may include Pressure While Drilling (PWD) devices, which measure pressure and potentially temperature at specific depths in the wellbore. While some sensors may read conditions internal to the drill string, PWD measurements may be beneficial for calibrating digital twin models with real-time data. This integration of downhole sensor data with surface measurements and digital simulations may enhance the system's ability to accurately model and respond to changing wellbore conditions throughout the drilling process.

As the fluid returns to the surface, it passes through the BOP and then the RCD and enters the low-pressure side of the circulation system. The low-side pressure sensor PSL may measure the surface back pressure before the choke. In some cases, during closed loop mode, an additional pressure sensor may be placed after the choke, enabling measurement of the pressure differential across the choke(s) in operation. It is noted that in a closed loop mode, before reaching the low-pressure side, the fluid may pass through a choke Manifold Assembly. This component can be used to control the wellbore pressure by adjusting the backpressure applied to the returning fluid. The choke Manifold Assembly may include multiple chokes (like choke 115) and valves that can be automatically or manually adjusted to maintain the desired wellbore pressure profile. In either case, the fluid then flows through the low-side pressure sensor PSL and VML, which measure the returning fluid's properties. The fluid then passes over the shale shaker 124, which removes larger cuttings and solids and dumps them onto the MWS for weight monitoring. The cuttings are disposed of in cuttings disposal 127 while cleaned fluid returns to the mud tanks 126, completing the circulation cycle.

This continuous circulation of drilling fluid helps to remove cuttings from the wellbore, cool and lubricate the drill bit, and maintain wellbore stability. The various sensors and meters on both the high-pressure and low-pressure sides of the system can allow for real-time monitoring of fluid properties and flow rates, which is beneficial for maintaining efficient and safe drilling operations. In some aspects, the sensors such as the flow rate sensors measure the velocity and/or amount (e.g. volume) of fluid flowing through the system. In addition, the sensors may also measure additional fluid properties such as density, temperature, and viscosity, providing a comprehensive characterization of the drilling fluid throughout the circulation system.

In addition to the sensors described in the drilling rig system 100, other sensors can also be present in the rig, either on the surface or downhole, to provide comprehensive monitoring and data collection for the autonomous drilling system. These additional sensors can include, but are not limited to, torque sensors, weight-on-bit sensors, rotary speed sensors, and directional sensors. For example, torque sensors can be installed on the top drive or drill string to measure the rotational force applied during drilling, while weight-on-bit sensors can be placed near the drill bit to measure the axial force applied to the formation.

It should be noted that in some aspects, top drive 112 may be hoisted up and down to perform drilling operations. This vertical movement may be accomplished by a drawworks 101, which can be a large motor powered winch-like device that controls the movement of the drilling equipment. The drawworks 101 may pull on a cable 103, which can be routed through a pulley system 105 mounted at the top of the derrick. By controlling the rotation of the drawworks 101, the system may raise or lower the top drive 112, allowing for precise control of the drill string's vertical position during drilling operations. This hoisting mechanism may enable the drilling system to adjust the weight on bit, make connections, and perform tripping operations as needed throughout the well construction process.

In some aspects, the rig can be equipped with downhole sensors integrated into the bottom hole assembly (BHA) or distributed along the drill string. These can include formation evaluation sensors such as gamma ray detectors, resistivity sensors, or neutron porosity sensors, which provide real-time data on the geological formations being drilled. Additionally, the system can incorporate downhole vibration sensors, acoustic sensors, or strain gauges to monitor drill string dynamics and wellbore conditions. In some cases, downhole pressure-while-drilling (PWD) sensors can be used to measure annular pressure and detect potential kicks or losses more accurately than surface measurements alone.

The rig controller 102 can play a role in managing and controlling the drilling rig system 100. It can receive data from various sensors throughout the rig, including the high-side pressure sensor PSH, VMH, low-side pressure sensor PSL, VML, and mud weight cuttings sensor MWS. In some cases, the rig controller 102 can also receive data from additional sensors such as torque sensors, weight-on-bit sensors, rotary speed sensors, and downhole sensors integrated into the bottom hole assembly.

In embodiments of this aspect, the rig controller 102 can be connected to the sensors and actuators of the rig through a combination of wired and wireless communication networks. The controller can receive data from various sensors, including surface sensors like pressure sensors and flow meters, as well as downhole sensors integrated into the bottom hole assembly, through data acquisition systems and telemetry networks. It can process this data in real-time and send control signals to actuators such as the drawworks, choke, mud pump, top drive, and rotating control device, adjusting drilling parameters based on the analyzed sensor data and AI output (i.e. recommendations and/or instructions). The controller can utilize industrial communication protocols to ensure reliable and secure data exchange between the control system and the rig's sensors and actuators.

The rig controller 102 can process sensor data in real-time, using it to monitor the drilling operation and make automated adjustments to various rig components. For example, it can control the mud pump 106 to adjust the flow rate of drilling fluid or modify the speed and torque of the top drive 112 based on the current drilling conditions. In some aspects, the rig controller 102 can manage the operation of the BOP 114, adjusting its settings based on the detected wellbore pressure and flow conditions. The BOP 114 may include seal rams that can be opened and closed during any operation at any time to secure or close the well if there is a well control issue. The RCD 114 may be configured in multiple states such as: either in use with a mechanical seal around the drill pipe, or without a seal/bearing assembly, effectively open to atmosphere. The rig controller 102 may monitor the state of the RCD 114 but may or may not adjust the RCD during active drilling operations. The RCD configuration may be set prior to beginning a particular drilling phase or operation.

The rig HMI 104 can serve as the primary interface between the operator and the autonomous drilling system. Through the rig HMI 104, the operator can view real-time data from sensors, monitor the status of various rig components, and observe output (i.e. recommendations and/or instructions) generated by the AI agent module (described in more detail later). In some cases, the rig HMI 104 can display graphical representations of the drilling operation, such as wellbore trajectory, formation data, and drilling parameter trends.

The operator can use the rig HMI 104 to input commands and adjust drilling parameters manually when desired. For instance, the operator can override automated settings, initiate specific drilling procedures, or respond to alerts and warnings generated by the system. In some aspects, the rig HMI 104 can allow the operator to switch between different operational modes, such as transitioning from automated drilling to manual control for specific operations or in response to unexpected situations.

To further elucidate the operation of the autonomous drilling system, a specific use case will now be described. This example will demonstrate how the various components of the system work together in a real-world scenario, illustrating the system's ability to detect and respond to potential drilling issues, optimize performance, and maintain wellbore stability. By walking through this use case, a clearer understanding is gained of how the system's data acquisition, digital twin simulations, AI analysis, and automated control functions interact to enhance drilling efficiency and safety.

In a specific use case, the operator can begin by inputting a well construction plan through the rig HMI 104 or the well construction plan may be received through other data channels. This plan can include details such as the target depth, expected formation characteristics, and planned trajectory of the wellbore. Once the plan is loaded, the digital twin framework incorporates this information into its models, creating a virtual representation of the planned well.

As drilling begins, the autonomous drilling system continuously monitors the well construction process using its array of sensors. The high-side pressure sensor PSH and VMH can measure the pressure and flow rate of the drilling fluid entering the wellbore, while the low-side pressure sensor PSL and VML monitor the returning fluid. The MWS can analyze the cuttings, providing real-time data on the formations being drilled.

It is noted that there is time lag before the cuttings reach the surface, ranging from a few minutes to more than an hour depending on the well depth. This lag time may be taken into account when interpreting the data from the MWS. Additionally, the MWS may sometimes measure materials from collapsed sections of the well, which can occur if wellbore stability is not maintained. Therefore, the system may also consider these factors when analyzing the cuttings data and correlating it with other sensor inputs to provide an accurate representation of the current downhole conditions.

In some aspects, the autonomous drilling system may incorporate a digital image analysis system (not shown) that can examine the cuttings coming off the shale shakers. This imaging technology may provide beneficial insights into the type of rock being drilled, the effectiveness of the drill bit, and potentially identify well collapse material. By analyzing the size, shape, and composition of the cuttings in real-time, the system may offer a more detailed understanding of the downhole conditions, enabling improved decision-making and potentially early detection of wellbore stability issues. This visual analysis capability may complement the existing sensor data, further enhancing the system's ability to optimize drilling operations and maintain wellbore integrity.

In this scenario, the system can detect a gradual increase in the weight of cuttings measured by the MWS, coupled with a slight decrease in the return flow rate measured by the VML. The AI agent module, analyzing this data in conjunction with the digital twin simulations, can identify a potential risk of hole cleaning issues and formation instability. It is noted that cleaning efficiency may be based on Equivalent Circulating Density (ECD), as excess cuttings in the wellbore increase return mud density, leading to higher back pressure and ECD, which in turn affects the overall well pressure profile at depth.

Based on this analysis, the AI agent module can recommend adjustments to the drilling parameters to mitigate the developing problem. These output (i.e. recommendations and/or instructions) can include increasing the mud flow rate to improve hole cleaning efficiency, adjusting the rotary speed to optimize cuttings transport, and modifying the mud properties to enhance wellbore stability.

It is noted that the ability to adjust the surface choke is beneficial in managing wellbore pressure and maintaining well control. The surface choke, which may be part of the choke manifold, can be opened or closed to increase or decrease the back pressure on the well. This mechanism plays a beneficial role in controlling the bottomhole pressure and overall well bore pressure profile and hence can help in managing the well bore stability. In practice, closing the surface choke restricts the flow of drilling fluid returning from the wellbore, which increases the back pressure in the system. This increased back pressure is transmitted down the wellbore, effectively increasing the bottomhole pressure. Conversely, opening the choke reduces the restriction on the return flow, decreasing the back pressure and, consequently, the bottomhole pressure. By manipulating the choke position, the drilling team can respond to changing downhole conditions, such as influxes or losses, in real-time. This capability is particularly beneficial in managed pressure drilling operations, where precise control of the wellbore pressure profile is beneficial for maintaining well stability and preventing kicks or lost circulation events.

The integrated rig control system, upon receiving these output (i.e. recommendations and/or instructions), can automatically implement the changes. For instance, it can increase the speed of the mud pump 106 to boost the mud flow rate, adjust the rotation speed of the top drive 112, control drawworks 101 to add or reduce weight of top drive 112, close the choke to increase annulus pressure, and signal for adjustments to the mud composition in the mud tanks 126.

Throughout this process, the operator can monitor the situation through the rig HMI 104, observing the real-time data, AI output (i.e. recommendations and/or instructions), and automated adjustments. The performance chart on the HMI display can show the changing trends in drilling parameters and predicted outcomes. If desired, the operator can use the well control and output (i.e. recommendations and/or instructions) to manually fine-tune the adjustments or override the automated actions. As a result of these proactive adjustments, the system can prevent the development of a serious hole cleaning problem or wellbore control and/or instability issue, allowing the drilling operation to continue safely and efficiently.

The autonomous drilling system can detect and compensate for a wide range of well construction issues, including but not limited to wellbore instability, hole cleaning problems, formation fluid influx (kicks), well breathing and ballooning, lost circulation, stuck pipe incidents, drill string vibrations, bit wear, formation pressure changes, wellbore trajectory deviations, and mud property imbalances. By continuously analyzing real-time data from surface and downhole sensors, the system can identify early signs of these issues and implement corrective actions. For example, it can adjust drilling parameters such as weight on bit, rotary speed, and mud flow rate to optimize drilling efficiency and maintain wellbore stability. The system can also modify mud properties (e.g., either automatically by injecting chemicals or changing fluid sources, or by providing modification instructions to the crew), adjust the wellbore trajectory, or initiate specialized drilling procedures to address specific challenges encountered during the well construction process.

Well control covers various types of well control. In one example, well control may be Managed Pressure Drilling (MPD) which is an adaptive drilling process that controls the annular pressure profile throughout the wellbore. This technique involves using specialized equipment and techniques to manage the bottomhole pressure within a narrow window between the pore pressure and fracture pressure of the formation. MPD systems may be particularly beneficial in challenging drilling environments, such as deepwater operations, high-pressure/high-temperature wells, or formations with narrow drilling windows.

In MPD operations, a closed-loop circulation system may be used, often including the RCD to seal the annulus. This setup allows for the application and adjustment of surface back pressure in real-time using automated chokes. The system may enable continuous monitoring of downhole pressures and fluid flows to detect and respond to minute changes in wellbore conditions. By manipulating surface back pressure, pump rates, and fluid properties, MPD systems may allow for precise control of the equivalent circulating density (ECD).

One of the advantages of MPD is its ability to enable drilling through narrow pressure margins or depleted zones that might be challenging with conventional methods. This capability may improve safety, reduce non-productive time, reduce well construction costs and potentially enable access to reserves that might be uneconomical with conventional drilling techniques. The precise control offered by MPD systems can be particularly beneficial in the context of autonomous drilling systems, as it allows for more accurate implementation of AI-generated recommendations and enhances the overall adaptability of the drilling process.

Some of the rig sensors utilized in the autonomous drilling system will now be described in detail in FIGS. 1B, 1C, and 1D. These figures provide a closer look at the VMH, VML, and mud cuttings measurement system MWS, respectively. These sensors can contribute to the real-time monitoring and analysis capabilities of the autonomous drilling system, enabling precise measurement of drilling fluid properties, flow rates, and cuttings characteristics throughout the well construction process.

Figure 1B:
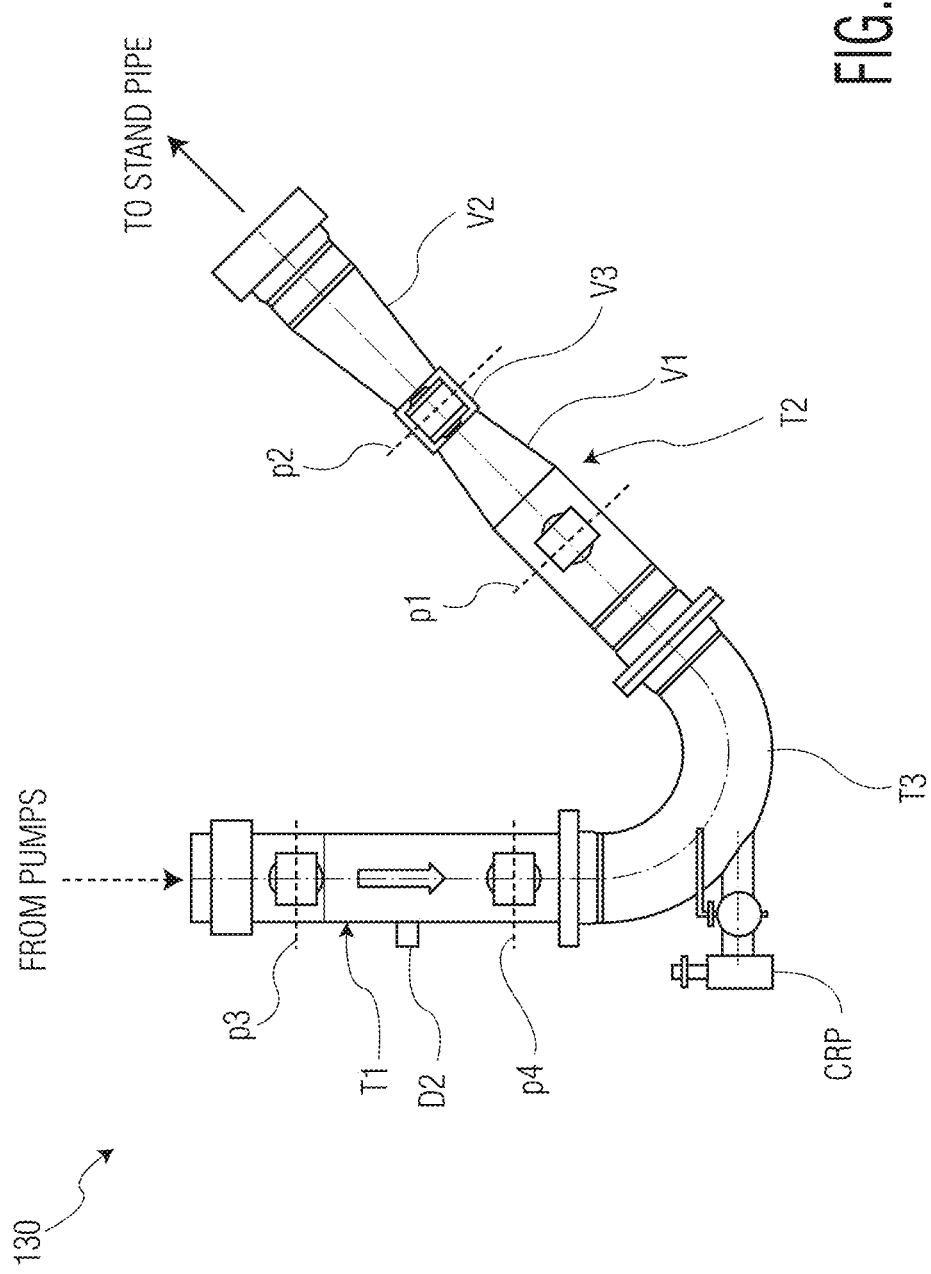
FIG. 1B illustrates a high-side Venturi meter for measuring drilling fluid flow rate, according to an embodiment.

Referring to FIG. 1B, the VMH 130 is depicted. This meter can be designed to measure the flow of drilling fluid entering the wellbore. The VMH 130 can include a conduit with a first tract T1 and a second tract T2. These tracts can be connected by a curved portion T3. The conduit provides a path for the drilling fluid to flow from the mud pumps 106 through the VMH 130 to the standpipe 108.

The VMH 130 also can include shut-off valves SV2 and SV3. These valves control the flow of drilling fluid through the conduit. In some cases, the shut-off valves SV2 and SV3 can be solenoid valves, which can be electronically controlled to open or close the flow path. In other cases, the shut-off valves SV2 and SV3 can be manually operated valves.

A port for removal of cuttings CRP can also be included in the VMH 130. This port allows for the extraction problematic materials or jetting of problem cuttings from the drilling fluid as it flows through the meter.

The VMH 130 operates based on the Venturi principle, which states that fluid speed increases when it flows through a constricted section of a pipe, causing a drop in fluid pressure. The VMH 130 can include a narrowed section, which includes frustoconical portions V1 and V2 and a linkage portion V3. As the drilling fluid flows through this narrowed section, it accelerates, causing a pressure drop. This pressure drop can be measured by differential pressure sensors p1, p2, p3, and p4, which are connected to the conduit at different points. The pressure differences measured by these sensors, particularly between p1 and p2, and between p3 and p4, are directly proportional to the square of the fluid flow rate, allowing the flow rate to be calculated. In some aspects, the VMH 130 can include additional features or components to enhance its performance. For example, it can include a thermal dispersion sensor D2, which measures the heat transfer rate from a heated sensor to the fluid. This measurement can provide additional information about the fluid flow rate, especially in low flow conditions. In other cases, the VMH 130 can be integrated with other sensors or devices, such as temperature sensors or flow switches, to provide a comprehensive monitoring system for the drilling fluid entering the wellbore from the sensors p4 and p3 the density of the fluid can be calculated.

Figure 1C:
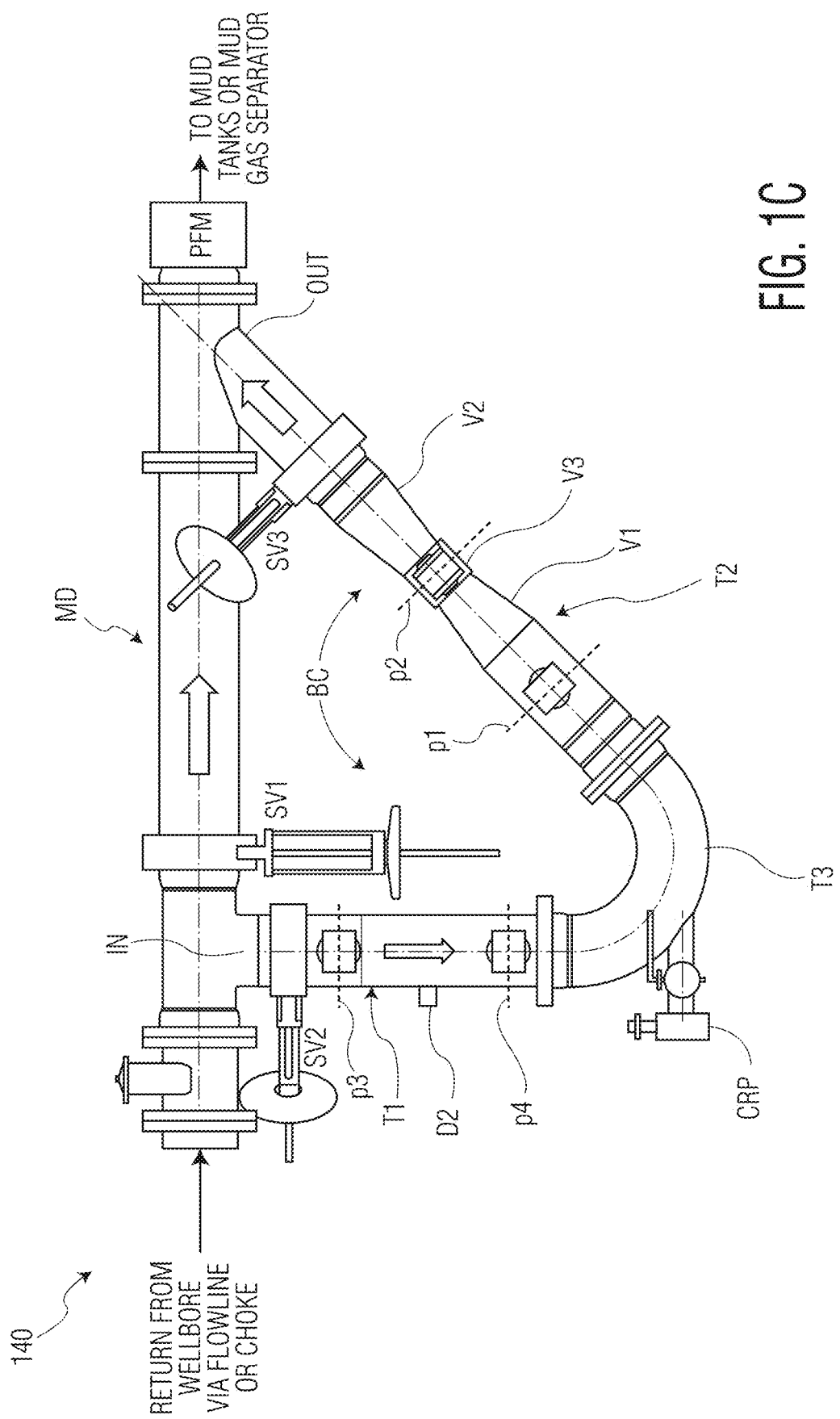
FIG. 1C illustrates a low-side Venturi meter for measuring drilling mud flow rate, according to an embodiment.

Referring to FIG. 1C, the VML 140 is depicted. This meter can be designed to measure the mass flow rate of drilling fluid exiting the wellbore in both open loop and closed loop drilling configurations. The VML 140 can include a bypass conduit BC with a first tract T1 that can be substantially vertical and a second tract T2 that can be inclined. These tracts can be connected by a curved portion T3. The bypass conduit BC provides a path for the drilling fluid to flow through the VML 140.

The VML 140 also can include shut-off valves SV2 and SV3. These valves control the flow of drilling fluid through the main duct MD and the bypass conduit BC to optional paddle flow meter (PFM) and to the shale shaker, mud tanks and cuttings disposal. In some cases, the shut-off valves SV2 and SV3 can be solenoid valves, which can be electronically controlled to open or close the flow path. In other cases, the shut-off valves SV2 and SV3 can be manually operated valves.

A port for removal of cuttings CRP can also be included in the VML 140. This port allows for the extraction problematic materials or jetting of problem cuttings from the drilling fluid as it flows through the meter.

The VML 140 operates based on the Venturi principle as described above. In some aspects, the VML 140 can include additional features or components to enhance its performance. For example, it can include a thermal dispersion sensor D2, which measures the heat transfer rate from a heated sensor to the fluid. This measurement can provide additional information about the fluid flow rate, especially in low flow conditions. In other cases, the VML 140 can be integrated with other sensors or devices, such as temperature sensors or flow switches, to provide a comprehensive monitoring system for the drilling fluid exiting the wellbore.

A beneficial element of the VML is its ability to function effectively in both open and closed loop drilling configurations, providing continuous measurement capabilities where a Coriolis mass flow meter may be ineffective in open loop scenarios. This versatility allows for seamless transitions between open and closed well construction operations without any loss of real-time well data or condition monitoring. Furthermore, the VML's design permits the standard flow paddle meter in the flowline before the shale shaker to operate normally, ensuring that existing monitoring systems remain fully functional. This dual compatibility enhances the system's flexibility and reliability, maintaining consistent data acquisition across various drilling modes and conditions.

Figure 1D:
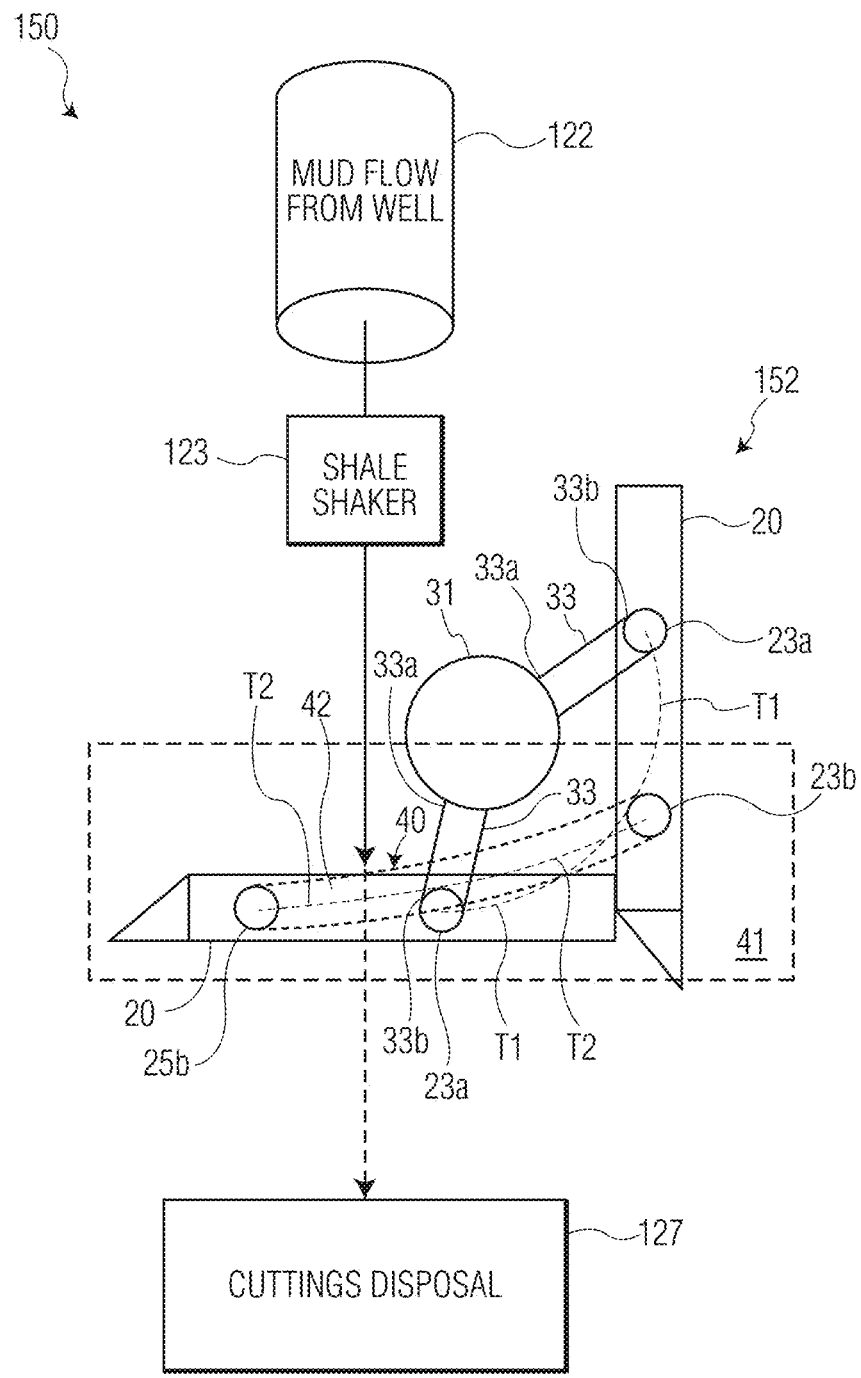
FIG. 1D illustrates a diagram of a mud cuttings measurement system, according to aspects of the present disclosure.

Referring to FIG. 1D, the mud cuttings measurement system 150 is depicted. This system can include a mud line 122 that receives mud flow from the well. The mud line 122 directs the mud flow to shale shaker 123 which filters certain solids from the mud dispenses the cuttings on a measurement device 152, which can be designed to analyze the weight of cuttings from the wellbore and determine parameters such as the volume of cuttings.

In some aspects, the autonomous drilling system may also use the cuttings data to generate a synthetic hole caliper survey, providing a detailed representation of the true shape and volume of the open hole that has been drilled. For example, the system may analyze the volume and characteristics of the cuttings, correlate this information with the drilling parameters and formation data, and use advanced algorithms to reconstruct the wellbore geometry. This synthetic caliper survey may provide valuable insights into wellbore stability, hole cleaning efficiency, and potential problem areas without the need for running a physical caliper tool. The system may continuously update this synthetic survey in real-time, allowing for proactive adjustments to drilling parameters and mud properties to maintain optimal wellbore conditions throughout the drilling process.

The measurement device 152 can include a tray 20 that is supported by a frame and can rotate between two positions. In the first position, the tray 20 is nearly horizontal, slightly tilted with the front end higher than the rear end. This position can be for collecting debris from the shale shaker. In the second position, the front end is lower than the rear end, allowing debris to be discharged by gravity.

The movement member controls the tray's rotation. The actuator 32 rotates the shaft 31, which in turn moves the arm 33. The arm's first end 33*a* is connected to shaft 31. The arm's second end 33*b* is connected to the first protrusion 23*a* on the tray, causing the tray to follow a circular trajectory T1. Simultaneously, the second protrusion 23*b* follows a curved trajectory T2 defined by the slot 42 in the guide 40.

This combination of movements results in a roto-translation of the tray between the two positions.

The device continuously alternates between loading debris in the first position and discharging it in the second position, allowing for continuous quantitative analysis of the drilling debris. The measured debris is then dumped into cuttings disposal 127.

In some aspects, the mud cuttings measurement system 150 can include additional sensors or components to enhance its performance. For example, it can incorporate a moisture sensor to measure the wet content (e.g. mud/oil/water) content of the cuttings, providing additional information about the drilling fluid properties. In other cases, the system can include a particle size analyzer to measure the size distribution of the cuttings, which can provide insights into the efficiency of the drilling process and the characteristics of the geological formations being drilled.

In some aspects, the autonomous drilling system may be configured to optimize the accuracy of the cuttings volume output by incorporating input from operators or well plan information regarding rock density and the percentage of mud at density on the cuttings being weighed. The system may also utilize offset lithological and geological data, when available, to specify the rock cutting properties. This can include information about cutting size and shape, which can affect the amount of mud carried with the cuttings over the shakers. By incorporating these additional data points, the system can enhance its ability to accurately assess wellbore conditions, optimize drilling parameters, and maintain efficient hole cleaning throughout the drilling process.

In some aspects, the mud cuttings measurement system 150 can be configured to operate in different drilling modes. For instance, it can operate in a continuous mode during normal drilling operations, providing real-time cuttings data. Alternatively, it can operate in a batch mode during specific drilling operations, such as when making a connection or performing a drilling test. This flexibility allows the system to adapt to different drilling conditions and operational requirements.

As mentioned above, the mud cuttings measurement system may estimate the volume of cuttings by averaging measurements across the time cycle when it is dumping cuttings, and the shale shaker is still producing and dumping cuttings past the mud cuttings weight sensor. This approach can allow for a more accurate representation of the continuous flow of cuttings, as it accounts for the cuttings that bypass the weight sensor during the dumping process. By utilizing this averaging method, the system may provide a more comprehensive and reliable estimate of the total cuttings volume, enabling an improved assessment of formation characteristics, drilling efficiency, and potential wellbore stability issues throughout the drilling operation. It can also include safety features, such as overload protection or fault detection systems, to ensure safe and reliable operation. In some aspects, the system may provide an estimate of the volume of hole drilled at depth and the volume of hole collapsed into the well from some open hole depth. This estimation capability may enhance the system's ability to monitor wellbore stability and detect potential issues such as formation collapse or excessive hole enlargement. By comparing the estimated drilled volume with the measured cuttings volume, the system may identify discrepancies that could indicate wellbore instability or other drilling-related problems. This information may be used to adjust drilling parameters, mud properties, or well trajectory to maintain optimal wellbore conditions and improve overall drilling efficiency.

In some cases, the mud cuttings measurement system 150 can be designed to handle different types of drilling fluids. For example, it can be configured to work with water-based muds, oil-based muds, synthetic-based muds, or other types of drilling fluids. This versatility allows the system to be used in a wide range of drilling operations, from conventional vertical drilling to complex horizontal or directional drilling.

In some aspects, the mud cuttings measurement system 150 can include features for easy maintenance and cleaning. For example, it can include removable components or access ports for easy cleaning or replacement of parts. It can also include self-cleaning features, such as automatic flushing or backwashing systems, to maintain its performance and reliability over extended periods of operation.

In some cases, the mud cuttings measurement system 150 can be designed for robust operation in harsh drilling environments. For example, it can include ruggedized components or protective housings to withstand high pressures, high temperatures, corrosive fluids, or abrasive cuttings. It can also include safety features, such as overload protection or fault detection systems, to ensure safe and reliable operation.

Overall, the mud cuttings measurement system 150 provides a function in the autonomous drilling system, enabling continuous monitoring and analysis of the cuttings from the wellbore. This data can be beneficial for assessing wellbore stability, optimizing hole cleaning efficiency, and enhancing the overall performance and safety of the drilling operation.

With this cutting measurement system 150, the autonomous drilling system may be able to derive the volume of cuttings that have come out of the hole. By utilizing assumed density values and the percentage of mud on the cuttings being weighed, the system can calculate the volume of cuttings based on the measured weight. The system may also average the measurements across the time cycle when it is dumping and the cuttings are still flowing off the end of the shale shaker, providing a more accurate representation of the continuous flow of cuttings. This capability can enable real-time monitoring of formation characteristics, drilling efficiency, and potential wellbore stability issues, further enhancing the system's ability to optimize drilling operations and maintain well integrity.

In some cases, the mud cuttings measurement system 150 may provide beneficial insights into wellbore stability issues. Some materials measured by the system may not be cuttings from the current drilling operation, but rather wellbore materials coming from the wellbore due to instability or collapse, leading to more cuttings volume than expected. Additionally, the system may detect metal swarf, cement, and packer cuttings returned due to other periodic operations outside of normal geological well formation drilling. The measurement device 152 can provide beneficial operational insight during these operations as well, supporting the improved ability to maintain well stability and control. By analyzing the quantity, composition, and timing of these unexpected materials, the system may help identify potential wellbore stability issues, allowing for proactive measures to be taken to prevent further deterioration and maintain well integrity.

Having described the overall rig structure, the details of the system will now be described with respect to the remaining figures, which provide visual representations of various components and processes of the autonomous drilling system. These figures illustrate the operational processes, network architecture, neural network module, and HMI, offering a comprehensive view of the system's structure and functionality. Through these illustrations, the intricate workings of the autonomous drilling system and its components will be elucidated, providing a clear understanding of how the system optimizes well construction operations.

Figure 2A:
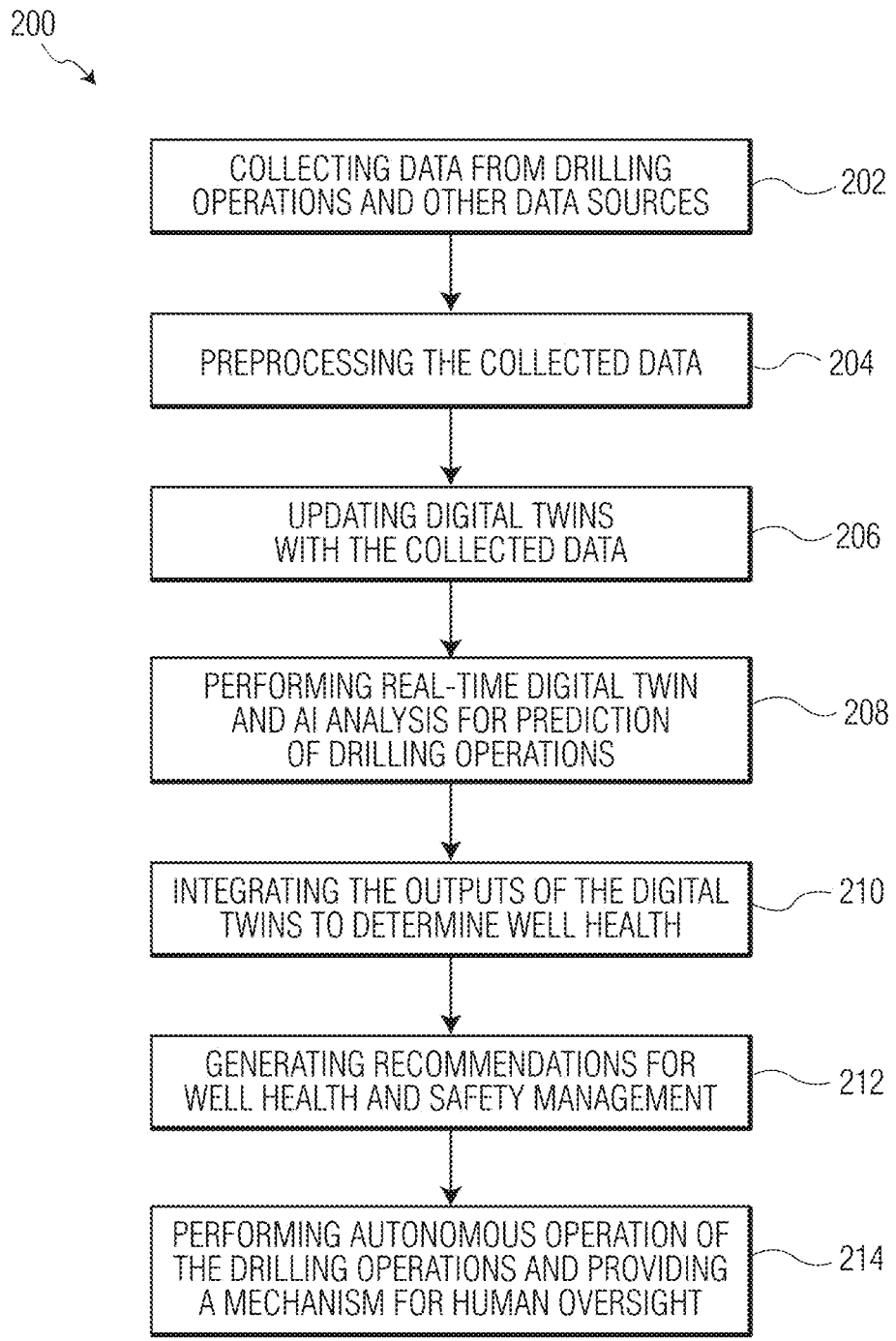
FIG. 2A illustrates a flowchart for an overall operational process of an autonomous drilling system, according to an embodiment.

Referring to FIG. 2A, the flowchart illustrates an overall operational process 200 of an autonomous drilling system. The process 200 can begin with a step 202, where data collection occurs. This step can involve collecting real-time data on drilling parameters from surface and downhole sensors, measuring mass flow rate of mud into and out of the well using flow meters, and analyzing characteristics of cuttings from the wellbore using cutting weight sensors.

In some aspects, the data acquisition system of the autonomous drilling system can include various types of sensors to collect a wide range of real-time data. For instance, the system can include pressure sensors to measure the pressure of the drilling fluid in the wellbore, temperature sensors to monitor the temperature of the drilling fluid and the wellbore, and vibration sensors to detect vibrations in the drill string and the wellbore. These sensors provide data that can be used to monitor the drilling operation and detect potential issues in real-time. Additionally, the system may incorporate data collected by the rig itself, such as hook load, rotary torque, and pump pressure. In some cases, the system may also integrate data from third-party service providers involved in the well construction process, which may include directional drilling data, formation evaluation logs, or mud logging information. This comprehensive data collection approach allows for a more holistic view of the drilling operation, enabling more accurate analysis and decision-making.

In some cases, the data acquisition system can also include flow meters to measure the mass flow rate of the drilling fluid into and out of the well. These flow meters can be based on various technologies, such as Venturi meters, Coriolis meters, or thermal dispersion meters. The choice of flow meter technology can depend on various factors, such as the expected flow rates, the properties of the drilling fluid, and the operating conditions of the well.

In addition to the above, the data acquisition system can also include cutting weight sensors to analyze the characteristics of the cuttings and other materials emanating from the wellbore. These sensors can measure various properties of the cuttings, such as their weight, volume, size, shape, density, and composition. The data from the cutting weight sensors can provide insights into the geological formations being drilled, the efficiency of the drilling process, return mud in the anulus and the condition of the wellbore.

The process 200 can then move to a step 204 for data preprocessing. In this step, raw data can be cleaned, filtered, and formatted for compatibility with the system. Additionally, derived data points can be generated through calculations based on sensor data. In some aspects, the data preprocessing step can involve various data cleaning and filtering techniques to remove noise, outliers, or erroneous data points from the raw data. This can help to improve the quality and reliability of the data, which is beneficial for the subsequent analysis and decision-making steps. In some cases, the data preprocessing step can also involve data transformation or normalization procedures to convert the raw data into a suitable format for the digital twin models and the AI algorithms. This can include scaling the data to a range, converting categorical data into numerical data, or encoding time-series data into a suitable format.

In some cases, the data preprocessing step can also involve feature engineering, where new features are created from the existing data to capture more complex relationships or patterns. This can include techniques such as polynomial features, interaction terms, or domain-specific transformations based on expert knowledge of the drilling process. Additionally, the preprocessing step can incorporate data augmentation techniques to enhance the robustness of the AI models, such as adding controlled noise to the data or generating synthetic samples to balance underrepresented classes or conditions.

In addition to the above, the data preprocessing step can also involve the generation of derived data points based on the raw data. These derived data points can be calculated using various mathematical or statistical operations, such as averages, sums, differences, ratios, or integrals. The derived data points can provide additional information that cannot be directly measured by the sensors but can be inferred from the raw data.

In some aspects, the derived data points can include complex calculations that combine multiple sensor readings to provide more comprehensive insights into the drilling process. These calculations may involve the identification and labeling of operational states, trends, or events in both time and depth domains. For example, the system may use simple statistical methods or more advanced machine learning and AI techniques to classify drilling states such as "drilling ahead," "making connections," or "tripping in/out."

The system may also identify and label trends in real-time, such as increasing or decreasing rate of penetration, changes in torque, or variations in mud properties. These labeled data points may be associated with both time stamps and depth measurements, allowing for multi-dimensional analysis of drilling operations.

In some cases, the system may employ pattern recognition algorithms to detect and label specific events, such as stick-slip occurrences, bit bouncing, or sudden changes in formation characteristics. These labeled events may provide beneficial context for understanding drilling performance and potential issues.

The autonomous drilling system may use both simple threshold-based rules and more sophisticated machine learning models to perform this labeling. For instance, a simple rule might label a period as "connection time" when the hook load exceeds a certain threshold and rotation stops. In contrast, a machine learning model might use a combination of multiple sensor inputs to identify more complex operational states or events.

By generating these labeled data points in both time and depth domains, the system may create a rich, annotated dataset that can be used for real-time decision making, post-well analysis, and continuous improvement of the AI models. This approach may enhance the system's ability to provide context-aware recommendations and optimize drilling operations based on a comprehensive understanding of past and current operational states and events.

For example, the system can calculate the rate of penetration (ROP) by combining depth measurements with time data or determine the equivalent circulating density (ECD) by considering the static mud weight, friction pressure losses, and annular velocity. In some cases, the system can also generate derived data points that represent trends or patterns over time, such as moving averages or rate of change calculations, which can help identify gradual shifts in drilling conditions or equipment performance.

The data preprocessing step can also involve the creation of dimensionless parameters or ratios that can provide information about the drilling process. For instance, the system can calculate the Reynolds number to characterize the flow regime in the wellbore, or the friction factor to assess the efficiency of fluid circulation. These derived parameters can help in making comparisons across different well sections or drilling operations, regardless of variations in well depth, mud properties, or other factors.

In some cases, the data preprocessing step can include the application of advanced signal processing techniques to extract meaningful information from complex sensor data. This can involve techniques such as Fourier transforms to analyze frequency components of vibration data, or wavelet analysis to detect transient events in pressure or flow rate measurements. The results of these analyses can be used to generate additional derived data points that capture specific characteristics of the drilling process, such as the presence of stick-slip vibrations or the occurrence of pressure pulses.

Next, the process 200 can proceed to a step 206 for digital twin update. This step can involve feeding real-time data and the well plan into a digital twin framework. Digital twins can simulate specific aspects of the well construction process, and the framework can be continuously updated to reflect the current state of the well.

In some aspects, the digital twin framework can include multiple digital twins, each simulating a specific aspect of the well construction process. For example, one digital twin can simulate the dynamics of the drill string, another can simulate the circulation of the drilling fluid, and another can simulate the geometry of the wellbore. Each digital twin can be updated in real-time with the latest data from the sensors, allowing the digital twins to provide accurate and up-to-date simulations of the drilling operation.

In some cases, the digital twin framework can also incorporate the well plan into the simulations. The well plan can provide information about the intended trajectory of the well, the target depth, the type of geological formations to be drilled, and the expected drilling parameters. By incorporating the well plan into the digital twin simulations, the system can compare the actual drilling operation with the planned operation and detect any deviations or anomalies.

In some aspects, the digital twin framework can include a complex network of interconnected digital twins, each focusing on a specific aspect of the drilling operation. For instance, a drill string dynamics digital twin can simulate the vibrations, stresses, and torque experienced by the drill string. A fluid dynamics digital twin can model the flow of drilling fluid, including its pressure, velocity, and temperature throughout the wellbore. A formation digital twin can represent the geological characteristics of the rock being drilled, including its porosity, permeability, and strength.

These digital twins can work together in a hierarchical or parallel structure, exchanging information and influencing each other's simulations. For example, the drill string dynamics digital twin can provide input on the bit rotation speed and weight on bit to the formation digital twin, which in turn can update the expected rate of penetration and formation characteristics. This information can then feed into the fluid dynamics digital twin to adjust the mud flow rate and properties.

In some cases, the digital twins can employ various modeling techniques, such as finite element analysis, computational fluid dynamics, or discrete element methods, depending on the specific aspect being simulated. These models can be continuously refined and calibrated based on the real-time sensor data, improving their accuracy and predictive capabilities over time.

The digital twin framework can also include an integration module that synthesizes the outputs from individual digital twins. This module can use advanced data fusion techniques, such as Kalman filtering or Bayesian inference, to combine the results from different simulations and resolve any discrepancies or uncertainties.

In some aspects, the digital twin framework can incorporate machine learning algorithms to enhance its predictive capabilities. These algorithms can analyze historical data and patterns to identify correlations and trends that cannot be apparent in physics-based models alone. For instance, a neural network can be trained to predict drill bit wear based on a combination of simulated stress data from the drill string dynamics digital twin and historical performance data.

In other words, the digital twin framework can be multifaceted and probabilistic in nature. For example, the framework can provide a range of possible outcomes for a given drilling scenario, each with an associated probability based on the confidence levels of the individual digital twins and their integrated analysis. These conclusions can include predictions of drilling performance, risk assessments for potential issues like stuck pipe or lost circulation, and output (i.e. recommendations and/or instructions) for improved (e.g. optimal) drilling parameters.

In some cases, the digital twin framework can also perform sensitivity analyses, running multiple simulations with varying input parameters to identify factors affecting the drilling operation. This can help in prioritizing which aspects of the operation to focus on for optimization or risk mitigation.

The process 200 can then advance to a step 208 for real-time analysis and prediction. In this step, AI agents analyze the data and use physics models to predict potential issues. Digital twins can run parallel simulations incorporating operational data, and predictive models forecast outcomes of drilling operations under various scenarios.

In some aspects, the AI agents can use various machine learning algorithms to analyze the data and make predictions. These algorithms can include supervised learning algorithms, unsupervised learning algorithms, reinforcement learning algorithms, or deep learning algorithms. The choice of algorithm can depend on the type of data, the complexity of the problem, and the available computational resources.

In some cases, the AI agents can also use physics models to make predictions. These physics models can be based on the laws of physics, such as the laws of motion, the laws of thermodynamics, or the laws of fluid dynamics. The physics models can provide a theoretical basis for the predictions, complementing the empirical learning of the machine learning algorithms.

In addition to the above, the digital twins can run parallel simulations incorporating the operational data. These simulations can provide a virtual representation of the drilling operation, allowing the system to explore various scenarios and predict the outcomes of different drilling strategies. The simulations can also provide a visual representation of the drilling operation, which can be useful for monitoring and troubleshooting purposes.

The predictive models in the autonomous drilling system can employ a combination of physics-based simulations and machine learning techniques to forecast outcomes of drilling operations under various scenarios. These models can utilize historical data, real-time sensor inputs, and digital twin simulations to make predictions about future drilling performance, potential issues, and improved (e.g. optimal) drilling parameters. In some cases, the predictive models can use ensemble methods, combining outputs from multiple algorithms to improve accuracy and robustness. The models can also incorporate uncertainty quantification techniques, providing confidence intervals or probability distributions for their predictions. As new data becomes available, the predictive models can continuously update and refine their forecasts, adapting to changing well conditions and improving their predictive capabilities over time.

The process 200 can then advance to a step 210 for integration of digital twin outputs. In this step, outputs from multiple digital twins can be aggregated by advanced AI models. The AI synthesizes information to determine well health and operational status. Patterns, correlations, and interactions are detected for comprehensive analysis.

In some aspects, the AI agent module of the autonomous drilling system can use various machine learning algorithms to analyze the data and make predictions. These algorithms can include supervised learning algorithms, unsupervised learning algorithms, reinforcement learning algorithms, or deep learning algorithms. The choice of algorithm can depend on the type of data, the complexity of the problem, and the available computational resources.

In some cases, the AI agent module can also use physics models to make predictions. These physics models can be based on the laws of physics, such as the laws of motion, the laws of thermodynamics, or the laws of fluid dynamics. The physics models can provide a theoretical basis for the predictions, complementing the empirical learning of the machine learning algorithms.

In some aspects, the AI agent module can employ advanced ensemble learning techniques to combine the outputs of multiple machine learning algorithms and physics models. This approach can leverage the strengths of different predictive methods, potentially improving the overall accuracy and robustness of the predictions. For example, a gradient boosting algorithm might be used in conjunction with a physics-based model to predict drill bit wear, with the machine learning algorithm capturing complex patterns in historical data while the physics model ensures adherence to known physical constraints.

The AI agent module can also incorporate adaptive learning capabilities, allowing it to continuously refine its predictive models based on new data and feedback from the drilling operation. This can involve techniques such as online learning or transfer learning, where the AI agent can quickly adapt to changing well conditions or apply knowledge gained from one well to improve predictions for another.

In some cases, the physics models used by the AI agent module can be enhanced with uncertainty quantification methods. These methods can provide probabilistic predictions that account for uncertainties in input parameters, model structure, and measurement errors. This can be particularly beneficial in drilling operations, where many factors are uncertain or difficult to measure precisely.

The digital twin simulations can be further enhanced with real-time optimization capabilities. As the simulations can run in parallel with the actual drilling operation, they can continuously explore different operational scenarios and suggest improved (e.g. optimal) drilling parameters. This can involve techniques such as model predictive control or reinforcement learning, where the AI agent learns to make sequential decisions that optimize long-term drilling performance.

The process 200 then proceeds to a step 212 for decision-making and adjustment output (i.e. recommendations and/or instructions) for well health and safety management. This step involves AI evaluating combined data to make predictions and recommend drilling adjustments. The system monitors for potential well control events and recommends corrective actions. Operators receive instructions to mitigate risks and prevent non-productive time. A real-time optimization engine suggests drilling parameters for efficiency and safety. The HMI displays output (i.e. recommendations and/or instructions) and allows for operator intervention.

In some aspects, the real-time optimization engine of the autonomous drilling system can use various optimization algorithms to suggest ideal drilling parameters. These algorithms can include linear programming, nonlinear programming, genetic algorithms, or swarm optimization algorithms. The choice of algorithm can depend on the type of problem, the complexity of the drilling operation, and the available computational resources.

In some cases, the real-time optimization engine can also use feedback control strategies to adjust the drilling parameters in real-time. These strategies can include proportional-integral-derivative (PID) control, model predictive control, or adaptive control. The choice of control strategy can depend on the dynamics of the drilling operation, the accuracy of the digital twin models, and the performance requirements of the drilling operation.

The process 200 then proceeds with a step 214 for autonomous operation and human oversight. The system autonomously adjusts drilling operations based on AI output (i.e. recommendations and/or instructions). Operators can intervene and manually adjust parameters if desired. The process can include continuous improvement through secure cloud connectivity and historical data learning.

In some aspects, the autonomous drilling system can include an integrated rig control system that can be configured to automate the drilling operations based on the AI output (i.e. recommendations and/or instructions). This control system can include various components, such as programmable logic controllers (PLCs), motor control centers, variable frequency drives, and safety systems. The control system can also interface with various drilling equipment, such as the top drive, the mud pumps, and the blowout preventer.

In some cases, the autonomous drilling system can also include an HMI that provides a user-friendly interface for the rig operators. The HMI can display real-time data, AI output (i.e. recommendations and/or instructions), and control options. The HMI can also allow the operators to manually intervene in the drilling process, providing a balance between automation and human oversight.

In some aspects, the autonomous drilling system can be configured to operate in both open loop and closed loop drilling configurations. In some aspects, the autonomous drilling system can be configured to utilize both high-pressure and low-pressure Venturi flow meters continuously, regardless of whether the drilling operation is in an open loop or closed loop configuration. This approach allows for comprehensive monitoring of drilling fluid flow rates throughout the system. The transition between open and closed loop configurations may be facilitated by the use of a choke manifold, which can include one or more adjustable chokes or a choke bypass. In an open loop configuration, the choke may be fully open, allowing the drilling fluid to flow freely to the atmosphere, or the choke may be bypassed completely in the open loop configuration. In a closed loop configuration, the choke may be partially closed to maintain backpressure on the wellbore.

The system may continuously monitor and adjust the choke position based on real-time data and AI recommendations to optimize drilling parameters and maintain wellbore stability. In cases where high-pressure flow meters are not installed or available, the system may estimate the input side flow rates using alternative data sources. These can include mud pump stroke counts multiplied by cylinder volume and efficiency factors, as well as mud report data for density calculations. The choke position and its effect on backpressure may also be factored into these calculations to ensure accurate flow rate estimations.

This flexibility in data acquisition, processing, and choke control enables the system to maintain accurate flow monitoring and adapt to various equipment configurations and operational conditions, thereby optimizing the drilling operation across different scenarios. The ability to seamlessly transition between open and closed loop configurations through choke manipulation allows the system to respond quickly to changing well conditions and maintain improved (e.g. optimal) drilling performance. As mentioned above, the ability to seamlessly transition between open and closed loop configurations may be achieved through a combination of RCD bearing seal assembly manipulation and valve position changes to redirect flow through the choke. This approach allows the system to respond quickly to changing well conditions and maintain improved (e.g. optimal) drilling performance. In open loop configuration, the RCD may operate without a bearing assembly, effectively open to atmosphere, while in closed loop configuration, the RCD may utilize a bearing assembly to create a seal around the drill pipe.

It is noted that the choke(s) used in the autonomous drilling system may be of various types, each capable of sustainably controlling flow in drilling operations. These may include linear chokes, which provide precise flow control through a linear valve movement; rotational orifice chokes, which adjust flow by rotating an orifice plate (some with multiple orifices); some choke valves can use automation and electric, air or Hydraulic actuators for local and remote operation; cage chokes, which use a cylindrical cage with flow ports for pressure control; wedge chokes, which employ a wedge-shaped plug for flow regulation; and ball chokes, which use a rotating ball with a bore to control flow. Other types of valves capable of sustainably choking flow may also be utilized, depending on the specific requirements of the drilling operation, the well conditions, and the desired level of control precision.

In some aspects, the AI's evaluation of combined data for predictions and drilling adjustment output (i.e. recommendations and/or instructions) can involve a sophisticated process of data fusion and multi-modal analysis. The AI can integrate real-time sensor data, historical well information, digital twin simulation outputs, and physics-based model predictions to create a comprehensive understanding of the current drilling state. This holistic approach can allow the AI to identify subtle patterns and correlations that might not be apparent when analyzing individual data streams in isolation. The AI can employ advanced techniques such as deep learning, reinforcement learning, or Bayesian inference to process this complex, high-dimensional data and generate actionable insights. These insights can include predictions of future drilling performance, potential risks or issues, and improved (e.g. optimal) drilling parameters for various scenarios. The AI can continuously refine its predictions and output (i.e. recommendations and/or instructions) as new data becomes available, adapting to changing well conditions and improving its decision-making capabilities over time.

It is noted that the AI agents described above can be deployed using a distributed architecture, with components running both on-site at the drilling rig and in cloud-based environments. The on-site deployment can include edge computing devices that process real-time sensor data and execute time-sensitive control algorithms, ensuring rapid response to changing drilling conditions. These edge devices can host lightweight versions of the AI models, optimized for low-latency decision-making. Meanwhile, more computationally intensive tasks, such as complex simulations and long-term trend analysis, can be performed in the cloud, leveraging scalable computing resources.

The deployment strategy can also incorporate a hierarchical structure, with different AI agents specializing in specific aspects of the drilling operation. For example, lower-level agents can focus on individual subsystems like mud pump control or drill string dynamics, while higher-level agents coordinate overall drilling strategy and risk management. This modular approach can allow for easier updates and maintenance of the AI system, as individual components can be refined or replaced without disrupting the operation. Additionally, the system can employ containerization technologies to ensure consistent performance across different hardware environments and facilitate seamless updates to the AI models as new algorithms or data become available.

Having described the overall operational process of the autonomous drilling system, FIG. 2B will be described which illustrates the specific actions taken by drilling operators within this advanced drilling system. This figure provides a detailed breakdown of the operator's role in the system, highlighting the points of human interaction and decision-making that complement the AI-driven processes. By examining these operator actions, we gain a clearer understanding of how human expertise and oversight are integrated with the autonomous capabilities of the system, ensuring safe, efficient, and effective drilling operations.

Figure 2B:
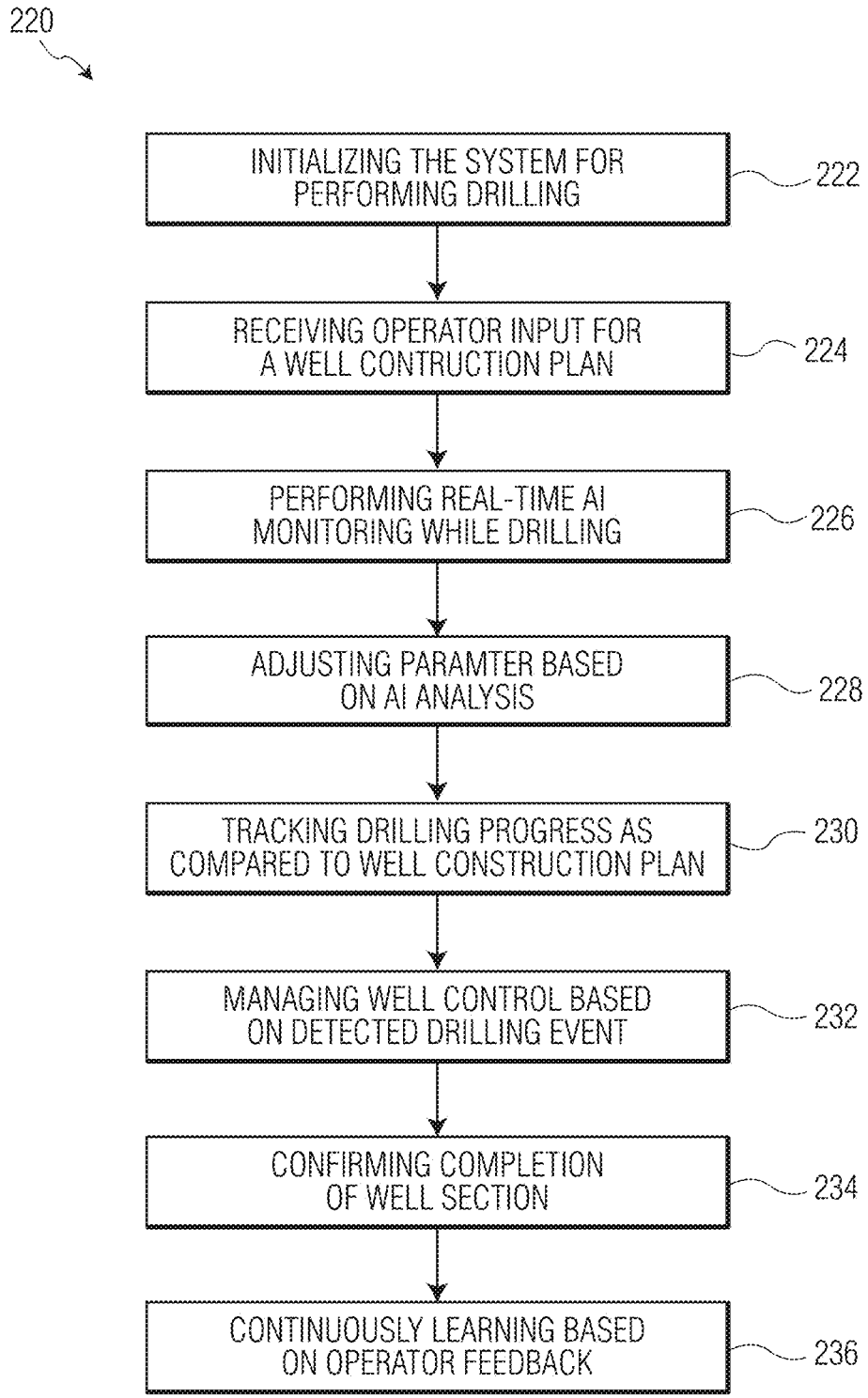
FIG. 2B illustrates a flowchart for operator actions in an autonomous drilling system, according to an embodiment.

Referring to FIG. 2B, the flowchart illustrates operator actions process 220 in an autonomous drilling system. The process 220 can begin with a step 222 for system initialization, where the operator powers on the autonomous drilling system and the system performs self-diagnostics and sensor checks. This initialization step ensures that components of the system are functioning correctly before drilling operations commence. In some cases, the system can perform additional checks or calibrations, such as verifying the accuracy of the sensors or testing the communication links between different components.

The process 220 can then move to a step 224 for operator input. In this step, the operator inputs or loads the well construction plan, and the system integrates the plan into the digital twin framework. The well construction plan can include various details about the intended drilling operation, such as the target depth, the expected geological formations, and the desired drilling parameters. The operator can input this plan through the HMI 104, using various input devices such as a keyboard, a mouse, or a touchscreen. In some cases, the well construction plan can be pre-loaded into the system from a database or a file, or it can be received from remote data sources, thereby reducing manual input.

Next, the process 220 can proceed to a step 226 for real-time monitoring. The operator observes real-time data and AI output (i.e. recommendations and/or instructions) on the HMI 104, while the system continuously collects and processes sensor data. The real-time data can include various drilling parameters, such as the weight on bit, the rotation speed, the mud flow rate, and the pressure and temperature in the wellbore. The AI output (i.e. recommendations and/or instructions) can include suggested adjustments to the drilling parameters, warnings about potential drilling hazards, or predictions about the drilling performance. The operator can monitor this information in real-time on the HMI 104, allowing them to maintain situational awareness and make informed decisions.

The process 220 then advances to a step 228 for parameter adjustment. The operator reviews the AI-suggested drilling parameter adjustments and can either accept the automated adjustments or manually override them as needed. The AI-suggested adjustments are generated by the AI agent module, which uses the real-time data, the digital twin simulations, and the historical well data to produce informed output (i.e. recommendations and/or instructions). The operator can review these output (i.e. recommendations and/or instructions) on the HMI 104 and decide whether to accept them or make manual adjustments. This step provides a balance between automation and human oversight, allowing the operator to leverage the AI's capabilities while maintaining control over the drilling operation.

Following this, the process 220 can move to a step 230 for drilling progress tracking. The operator monitors the drilling progress against the well plan, and the system provides updates on well health and potential issues. The drilling progress can be tracked in terms of various metrics, such as the depth drilled, the rate of penetration, or the volume of cuttings removed. The system can provide updates on the well health based on the sensor data and the AI analysis, alerting the operator to any changes in the well conditions or potential drilling hazards. This step allows the operator to keep track of the drilling progress and respond promptly to any issues.

The process 220 can then proceed to a step 232 for well control event management. The system alerts the operator to potential well control events, and the operator follows the AI-recommended actions or implements manual intervention. Well control events can include situations such as kicks, losses, or stuck pipe incidents, which can pose risks to the drilling operation and the well integrity. The system can detect these events based on the sensor data and the AI analysis, and it can alert the operator through the HMI 104. The AI can also recommend corrective actions, such as adjusting the mud weight, changing the drilling platform parameters (e.g. control the drilling itself, the pressure via the choke, etc.), or shutting in the well. The operator can follow these AI-recommended actions or implement their own manual intervention, depending on their judgement and expertise.

Next, the process 220 can advance to a step 234 for end of section/well completion. The operator confirms the completion of the drilling section or the entire well, and the system generates final reports and data analysis. The operator can confirm the completion through the HMI 104, marking the end of the drilling operation. The system can then generate final reports summarizing the drilling performance, the well data, and any issues encountered. The system can also perform a final data analysis, comparing the actual drilling results with the well plan and the digital twin predictions. This step provides a comprehensive summary of the drilling operation, allowing for post-drilling review and learning.

The process 220 then proceeds with a step 236 for continuous learning. The operator can provide feedback on the system performance, and the system updates the AI models and the historical database for future operations. Throughout the drilling operation, operators continuously provide comments, data labeling, and feedback, enabling real-time system refinement and optimization. The operator can provide feedback through the HMI 104, commenting on the system's performance, the accuracy of the AI output (i.e. recommendations and/or instructions), or any issues encountered. The system can then use this feedback to update the AI models, improving their learning and prediction capabilities. The system can also update the historical database with the new well data, enriching the data set for future operations. This step ensures that the system continuously learns and improves over time, enhancing its performance and reliability for future drilling operations.

In some aspects, the continuous learning step can involve a multi-faceted approach to system improvement. The operator feedback can be categorized into different types, such as accuracy of predictions, timeliness of alerts, effectiveness of recommended actions, and overall system usability. This categorization can allow for targeted improvements in specific areas of the system's performance.

The AI models can employ advanced machine learning techniques, such as transfer learning or meta-learning, to efficiently incorporate new knowledge without compromising previously learned information. This approach can enable the system to adapt to new drilling scenarios or geological formations while retaining its expertise in familiar situations.

In some cases, the system can implement a form of active learning, where it identifies areas of uncertainty in its predictions and actively seeks operator input or input from offsite or third party entities on these specific issues. This targeted approach to gathering feedback can accelerate the learning process and improve the system's performance in challenging well construction activities.

The historical database update process can involve sophisticated data management techniques, such as data versioning and provenance tracking. These techniques can allow the system to maintain a comprehensive record of how its knowledge evolves over time, enabling rollbacks to previous states if beneficial and providing insights into the system's learning trajectory.

In some aspects, the continuous learning process can extend beyond individual well operations to incorporate cross-well and cross-field learning. The system can identify patterns and best practices across multiple drilling operations, potentially leading to broader insights into improved (e.g. optimal) drilling strategies for different geological formations or operational conditions.

The system can also implement a form of explainable AI, allowing operators to understand the reasoning behind the AI's output (i.e. recommendations and/or instructions) and predictions. This transparency can foster trust between the operators and the AI system, encouraging more frequent and detailed feedback and ultimately leading to more effective continuous improvement.

In some aspects, the operator actions process 220 can include additional steps or variations. For example, the process can include a step for equipment setup or calibration before the system initialization. The process can also include a step for data backup or archiving after the well completion. The process can include additional monitoring or control steps, such as monitoring the equipment health, controlling the rig systems, or coordinating with other personnel. The process can also include steps for handling emergencies or unexpected events, such as activating safety systems, implementing emergency procedures, or coordinating with emergency response teams. These additional steps or variations can enhance the operator's control over the drilling operation and the system's ability to handle a wide range of drilling scenarios.

The autonomous drilling system may operate with varying levels of autonomy, adapting to the operator's preferences and the system's capabilities. In some cases, the system might make fully autonomous adjustments to drilling parameters without requiring operator intervention based on AI instructions. In other instances, it may generate suggested adjustments that need confirmation or acceptance by the driller or operator before implementation. The system can also provide recommendations that require manual input from the operator, or issue alarms and alerts that may or may not necessitate operator action, depending on the severity and nature of the situation. As the digital twin models, AI components, and associated systems become more intelligent over time through continued training and programming, the system may evolve to become increasingly autonomous, potentially reducing the need for frequent operator intervention while maintaining the option for human oversight and control when beneficial.

For example, in the context of drilling operations, the spectrum of automation levels may be applied to various aspects of the drilling process. At the lower end of the spectrum, the system may function as a computer-based aid by providing real-time data on drilling parameters such as weight on bit, rotary speed, and mud flow rate, allowing the driller to make informed decisions. As the level of automation increases, the system may offer advisory functions, such as suggesting improved (e.g. optimal) drilling parameters based on formation characteristics and historical data.

Moving further along the automation spectrum, the system may make decisions and execute actions with varying degrees of human oversight in specific drilling operations. For example, in computer-based decision-making, the system may determine the improved (e.g. optimal) drilling trajectory based on real-time formation evaluation data but inform the driller who can override the decision if beneficial. At higher levels of automation, the system may perform computer-based execution by automatically adjusting drilling parameters such as weight on bit and rotary speed to maintain the improved (e.g. optimal) rate of penetration, while the driller monitors and has the option to intervene.

The most advanced level may involve full automation of certain drilling processes, such as tripping operations or pressure management during managed pressure drilling. In these cases, the system may perform all tasks without human intervention, including making connections, adjusting mud weight, and controlling wellbore pressure. However, the capability for human oversight and intervention may still be maintained as a safety measure, allowing the driller to take control in case of unexpected events or system anomalies. This range of automation levels in drilling operations allows the autonomous drilling system to be tailored to specific well complexities, crew expertise levels, and company risk management policies.

Figure 3:
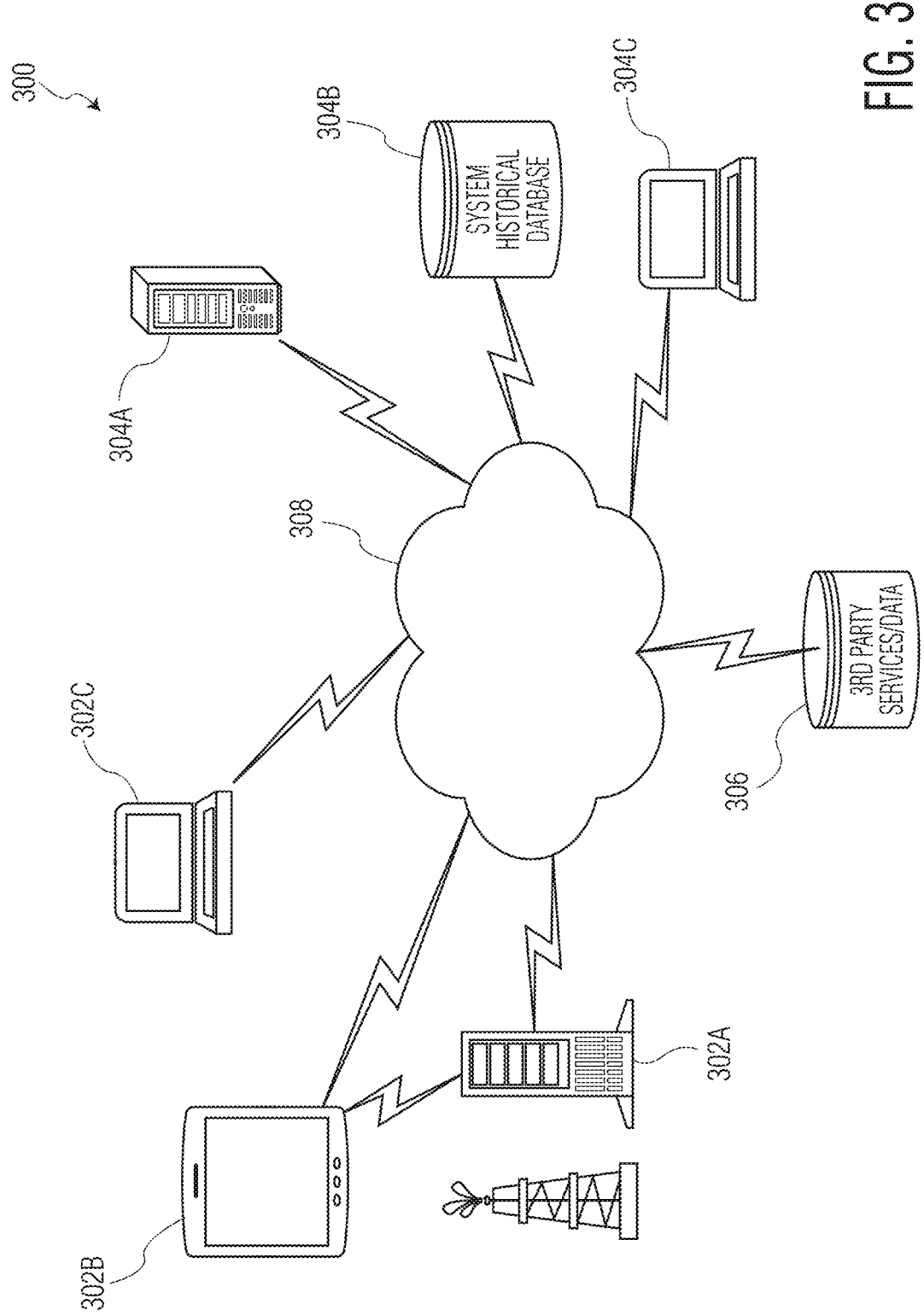
FIG. 3 illustrates a network diagram for an autonomous drilling system, according to aspects of the present disclosure.

Referring to FIG. 3, the network diagram 300 illustrates an example cloud-based architecture of the autonomous drilling system. The diagram shows the interconnections between various components of the system, highlighting the role of the cloud network 308 in facilitating communication and data exchange.

On the drilling site, the network can include a rig controller 302A, a rig HMI 302B, and a PC 302C. These components are connected to the cloud network 308, allowing for remote monitoring and control of drilling operations.

The rig controller 302A can be responsible for controlling the drilling equipment and processes on the rig. The rig HMI 302B provides a user-friendly interface for the rig operators to monitor real-time data, receive AI output (i.e. recommendations and/or instructions), and manually intervene in the drilling process if desired. The PC 302C can be used for additional data analysis, reporting, or remote control functions.

On the system side, the network can include system models server 304A, system historical database 304B, and a system control center 304C. The system models server 304A can host the digital twin models and drilling well plans, providing the computational resources for the real-time simulations and predictions. The system historical database 304B can store past operational data, enriching the data set for the AI algorithms and enabling continuous learning. The system control center 304C can provide centralized management of the system, coordinating the data flow, the AI analysis, and the control actions.

In this example, the network diagram 300 also shows third party services 306 connected to the cloud network 308. This indicates the system's ability to integrate external data or services, such as geological data, weather forecasts, or third-party drilling software. This integration can enhance the system's capabilities and provide additional insights for the drilling operation.

The cloud network 308 can serve as the central hub, facilitating communication and data exchange between the components. This cloud-based architecture allows for real-time data processing, remote access, and scalability of the autonomous drilling system.

In some aspects, the network architecture of the autonomous drilling system can include additional components or features. For example, it can include redundant servers or databases for data backup and recovery. It can also include security features, such as firewalls, encryption, or authentication mechanisms, to protect the data and the system from cyber threats. In some cases, the network can also include wireless communication links, such as satellite or cellular connections, to enable remote operation in locations without wired internet access.

In some cases, the network architecture can be configured to support different types of cloud services, such as Infrastructure as a Service (IaaS), Platform as a Service (PaaS), or Software as a Service (SaaS). This flexibility allows the system to leverage the advantages of cloud computing, such as scalability, cost-effectiveness, and accessibility, while meeting the specific needs of the drilling operation.

In some aspects, the network architecture can be designed for robust operation in harsh drilling environments. For example, it can include ruggedized hardware, industrial-grade network equipment, or fault-tolerant systems to withstand high temperatures, vibrations, or other challenging conditions on the drilling rig. It can also include remote monitoring and diagnostic capabilities to ensure reliable operation and quick resolution of any network issues.

It is noted that the network configuration in FIG. 3 may incorporate a hybrid cloud architecture that combines on-site and off-site infrastructure for all devices shown. The drilling side components, including the rig controller 302A, rig HMI 302B, and PC 302C, may connect to a local "edge cloud" at the well site, which may comprise data integration and storage systems along with computing resources capable of running digital twin simulations and AI algorithms independently. This on-site infrastructure may synchronize with off-site cloud services when available, enabling seamless data exchange and remote operations. The system-side components, including the models server 304A, historical database 304B, and control center 304C, may be distributed between the on-site edge cloud and off-site cloud infrastructure, allowing for flexible allocation of computational resources. The third party services 306 may integrate with both the on-site and off-site components through the cloud network 308, which serves as the central hub for communication and data exchange. As computational demands grow, the on-site processing capabilities for all devices may be expanded, enhancing the system's ability to perform complex analyses and make real-time decisions directly at the well site.

The steps outlined in FIG. 2A and FIG. 2B can be executed by the devices shown in FIG. 3 through a coordinated effort leveraging the cloud-based architecture of the autonomous drilling system.

The data collection step 202 can primarily involve the rig controller 302A, which interfaces with various sensors and equipment on the drilling rig. This real-time data can be transmitted through the cloud network 308 to the system models server 304A for processing. The data preprocessing step 204 can occur on the system models server 304A, where raw data is cleaned, filtered, and formatted for use in the digital twin models.

The digital twin update step 206 can be executed on the system models server 304A, which hosts the digital twin models. The server can continuously update these models with the preprocessed real-time data and well plan information stored in the system historical database 304B.

For the real-time analysis and prediction step 208, the system models server 304A can run AI algorithms to analyze the data and generate predictions. The digital twin simulations can also be executed on this server, leveraging its computational resources.

The integration of digital twin outputs at step 210 and the decision-making process at step 212 can occur on the system control center 304C. This component can aggregate outputs from multiple digital twins, synthesize the information, and generate recommendations for drilling adjustments.

The autonomous operation and human oversight step 214 can involve both the system control center 304C and the drilling side components. The system control center 304C can send automated adjustment commands to the rig controller 302A, while the rig HMI 302B can display recommendations and allow for operator intervention.

The operator actions outlined in FIG. 2B can primarily involve interactions with the rig HMI 302B. The system initialization step 222 and operator input step 224 can be carried out through this interface, with the input data being transmitted to the system models server 304A and system historical database 304B via the cloud network 308.

Real-time monitoring step 226 and parameter adjustment step 228 can involve the rig HMI 302B displaying data and recommendations from the system control center 304C, and the operator using the interface to accept or override these recommendations/instructions.

Drilling progress tracking step 230 and well control event management step 232 can rely on the system control center 304C processing data from the rig controller 302A and sending alerts and updates to the rig HMI 302B.

In some aspects, the autonomous drilling system may incorporate multiple rig HMIs to facilitate effective information and control management across various locations and functions at the well site. These HMIs may serve different purposes, with some designed for comprehensive operator control at a central station, while others may be distributed throughout the rig site for specialized monitoring and control tasks. The system may include read-only HMIs for monitoring purposes, as well as HMIs with full control capabilities and data input rights. Examples of specialized HMIs may include interfaces for Managed Pressure Drilling (MPD), Measurement While Drilling (MWD) directional operations, mud logging, well control, activity performance management, and systems for providing recommendations and feedback. This flexible HMI configuration may enable efficient information dissemination and control across different drilling disciplines and operational areas.

The end of section/well completion step 234 can trigger the system control center 304C to generate final reports, which can be viewed on both the rig HMI 302B and the PC 302C.

The continuous learning step 236 can involve the operator providing feedback through the rig HMI 302B, which can be sent to the system models server 304A to update AI models, and to the system historical database 304B to enrich the dataset for future operations.

Throughout these processes, the cloud network 308 can facilitate seamless communication between the components, enabling real-time data exchange and remote access capabilities. The third party services 306 can provide additional data or functionality, integrating with the system through the cloud network 308.

Figure 4:
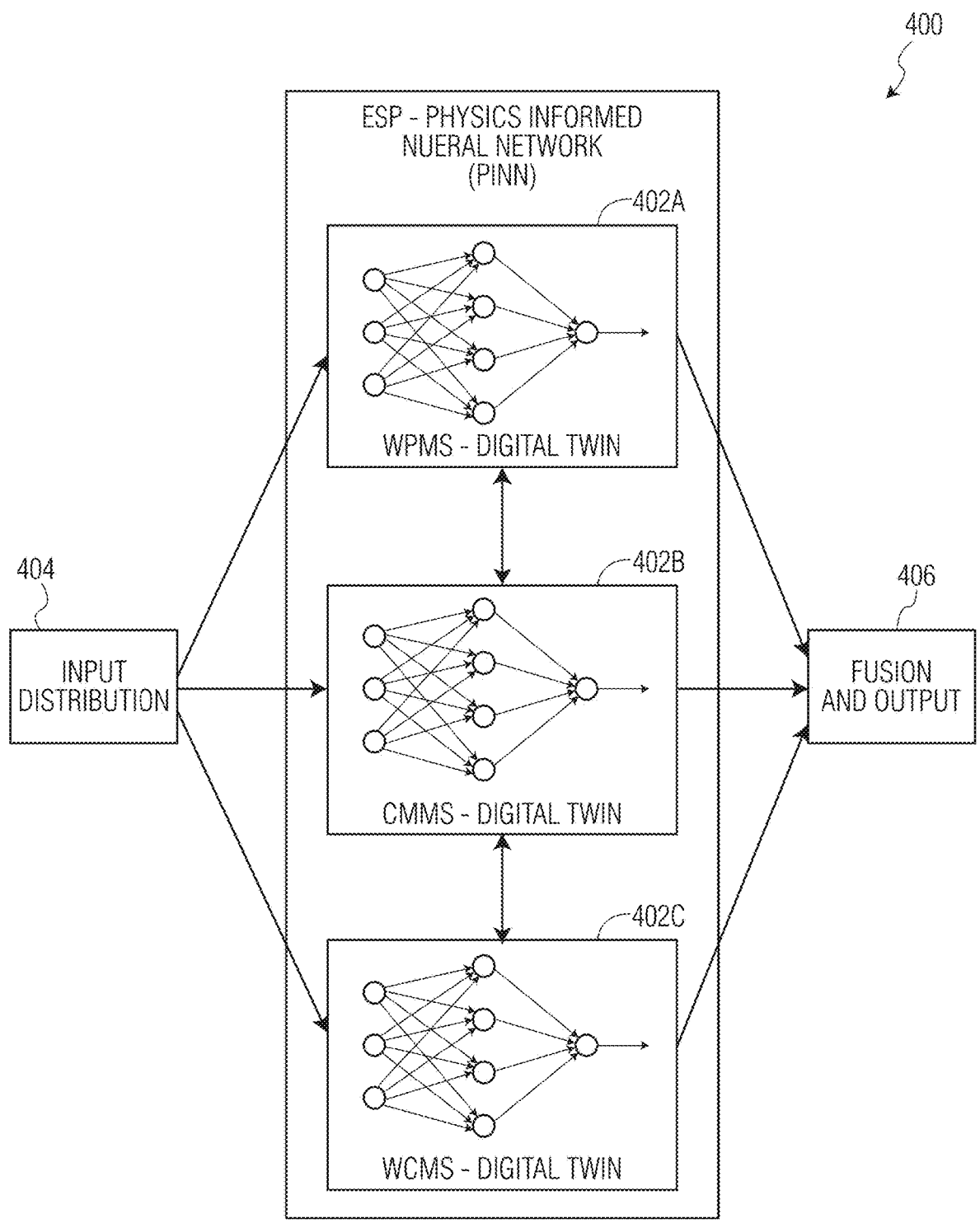
FIG. 4 illustrates a block diagram of a neural network module for an autonomous drilling system, according to an embodiment.

Referring to FIG. 4, the block diagram illustrates a neural network module 400 for an autonomous drilling system. The neural network module 400 may include an input distribution module 404, three digital twin models, and a fusion and output module 406.

The input distribution module 404 can be responsible for distributing the collected real-time data to the digital twin models. This module can preprocess the data to ensure compatibility with the models, such as normalizing the data or converting it into a suitable format. In some cases, the input distribution module 404 can also perform data augmentation techniques, such as adding noise or generating synthetic data, to enhance the robustness of the models.

The autonomous drilling system may focus on well pressure, flow, and stability control. The digital twin models may therefore incorporate parameters such as pressure and flow dynamics, drilling rate, drill string RPM, weight on drill bit (WOB), trip rate (in/out), surface back pressure choke (position/flow pressure response), and surge and swap pressures. These model aspects can be beneficial for maintaining wellbore stability, optimizing drilling performance, and preventing well control incidents. By continuously monitoring and analyzing these parameters, the system may be able to predict and mitigate potential issues, adjust drilling operations in real-time, and ensure safe and efficient well construction.

In some aspects, the input data for the autonomous drilling system can include a wide range of parameters and measurements from various components of the drilling operation. This comprehensive data set can encompass, but is not limited to, wellbore and drilling parameters, such as rate of penetration, weight on bit, and torque; pump data, including pressure and flow rate; standpipe data, such as pressure and temperature; and top drive data, like rotary speed and torque. The input data can also include wellbore data, such as inclination, azimuth, and depth; Rotating Control Device (RCD) data, including seal pressure and wear; and Managed Pressure Drilling (MPD) and well control choke(s) data, such as choke position and backpressure data; High Pressure (HP) and Low Pressure (LP) mass flow meter data, providing accurate measurements of drilling fluid flow rates; mud data, including density, viscosity, and electrical stability; tank data, such as volume and temperature; flare data, like gas composition and flow rate; casing running data, including string weight and makeup torque; cementing data, such as slurry density and pump rate; and rig operation state data, which can include information about the current phase of the drilling operation, equipment status, and crew activities. This wide range of input data allows the autonomous drilling system to maintain a holistic view of the entire drilling operation, enabling more accurate predictions and informed decision-making.

The digital twin models in the neural network module 400 can include a well physics model digital twin 402A, a cuttings management model digital twin 402B, and a well control model digital twin 402C among other applicable models. Each of these digital twins can simulate a specific aspect of the well construction process, providing a virtual representation of the well and the drilling operations.

In some aspects, the autonomous drilling system may incorporate additional or alternative digital twin models to enhance its capabilities and address specific drilling challenges. For example, a reservoir characterization digital twin may be implemented to simulate and predict formation properties, fluid behavior, and production potential in real-time. Another example could be a drill string dynamics digital twin, which may model the complex vibrations, stresses, and interactions of the drill string with the wellbore, potentially improving drilling efficiency and reducing the risk of equipment failure.

For example, the well physics model digital twin 402A simulates the physical properties and dynamics of the well and the drilling process. This can include the behavior of the drill string, the fluid dynamics of the drilling mud, the thermal properties of the wellbore, and the mechanical properties of the geological formations. In some cases, the well physics model digital twin 402A can also simulate the interactions between these components, such as the effect of drill string vibrations on the mud flow or the impact of temperature changes on the wellbore stability.

The cuttings management model digital twin 402B can simulate the generation, transport, and removal of cuttings from the wellbore. This can include the fragmentation of the rock formations by the drill bit, the entrainment of the cuttings in the mud flow, the deposition and erosion of cuttings in the wellbore, and the separation of cuttings at the surface. In some cases, the cuttings management model digital twin 402B can also simulate the effect of drilling parameters on the cuttings management, such as the impact of mud flow rate or drill string rotation speed on the cuttings transport efficiency.

The well control model digital twin 402C can simulate the control of the well pressure and the prevention of well control events. This can include the regulation of the mud weight and the surface backpressure, the detection and control of fluid influxes or losses, and the response to well control events such as kicks or losses. In some cases, the well control model digital twin 402C can also simulate the effect of drilling parameters on the well control, such as the impact of drill string movement or mud composition on the well pressure.

The fusion and output module 406 can aggregate the outputs from the digital twin models and synthesizes the information to determine the well health and operational status. This module can use various data fusion techniques, such as weighted averaging, voting, or machine learning algorithms, to combine the outputs from the digital twins. The fusion and output module 406 can also generate an output (i.e. recommendations and/or instructions) for drilling parameter adjustments based on the aggregated outputs and the well health status.

In some aspects, the outputs of digital twin models may be sequentially input to one another, creating a cascading flow of information through the system. For instance, the fusion and output module 406 may also output its results to another digital twin model for further analysis. This sequential input-output process may allow for more complex, multi-stage simulations and analyses, where the output of one model becomes a beneficial input for another, potentially enabling the system to capture interdependencies and feedback loops within the drilling operation. Such an approach may enhance the system's ability to model and predict complex drilling scenarios, improving overall decision-making and operational efficiency.

The output data from the autonomous drilling system can include a wide range of indicators and analyses for efficient and safe drilling operations. Digital twin model verification and calibration data can be provided, ensuring the accuracy of the simulations by comparing predicted values with actual measurements. Formation evaluation outputs can include porosity, permeability, and fluid content estimates, while the geological model can provide updated stratigraphic information and structural interpretations based on real-time drilling data.

The system can generate various well health indicators, such as hole instability indicators (e.g., cavings or washouts), kick early and positive indicators (e.g., sudden increases in return flow rate or pit volume), and ballooning indicators (e.g., cyclic variations in downhole pressure). Sticking indicators can include torque fluctuations or hook load variations, while cuttings build-up or loss of circulation indicators can involve changes in return flow rate or drilling fluid properties. Well control indicators might encompass gas levels in the mud, formation pressure trends, or sudden changes in downhole pressure. Formation breakdown and collapse indicators can include sudden drops in standpipe pressure or unexpected changes in hole diameter. Drilling vibration indicators can cover stick-slip, whirl, or axial vibrations, while potential twist-off indicators might involve progressive increases in torque or sudden changes in drill string tension.

The system can provide data on various drilling equipment in use and potential issues that may arise during operations. For example, it may detect and report on drilling motor stalls, which can be indicated by sudden increase in differential pressure. In some cases, the system may monitor mud pump performance and identify potential piston, valve, or liner failures that could result in lower flow to the well. The system may also be capable of detecting drillstring washouts, which can be indicated by unexpected changes in pressure or flow rates. Additionally, the system may provide data on bit conditions, such as rate of penetration trends or torque responses, which can help improve (e.g. optimize) drilling performance and predict bit wear. In some aspects, the system may monitor and report on top drive performance, including rotary speed and torque data. The system may also track and analyze data, such as hook load and block position. Furthermore, the system may provide control system setpoints or advisory information for improved (e.g. optimal) drilling parameters based on the aggregated data and analysis from various equipment and sensors throughout the drilling operation.

In some aspects, the neural network module 400 can include additional components or features. For example, it can include a learning module that updates the digital twin models based on the feedback from the fusion and output module 406. This learning module can use various machine learning algorithms, such as supervised learning, unsupervised learning, deep learning or reinforcement learning, to improve the accuracy and robustness of the digital twin models. In some cases, the neural network module 400 can also include a visualization module that generates graphical representations of the digital twin simulations and the well health status, providing a visual aid for the operators and the decision-makers.

The fusion and output module 406 can also incorporate temporal aspects in its analysis. It can use time series analysis techniques to identify trends and patterns in the aggregated data over time, potentially enabling early detection of developing issues or optimization opportunities. In some implementations, the module can employ recurrent neural networks or long short-term memory (LSTM) networks to capture and utilize temporal dependencies in the data.

When generating output (i.e. recommendations and/or instructions) for drilling parameter adjustments, the fusion and output module 406 can utilize optimization algorithms. These algorithms can consider multiple objectives simultaneously, such as maximizing drilling efficiency, minimizing risk, and optimizing cost. In some cases, the module can employ reinforcement learning techniques, where the system learns to make sequences of decisions to optimize long-term outcomes.

The fusion and output module 406 can also include explainable AI features, providing transparency into how it arrives at its conclusions and output (i.e. recommendations and/or instructions). This can involve techniques such as SHAP (SHapley Additive exPlanations) values or LIME (Local Interpretable Model-agnostic Explanations) to help operators understand the factors influencing the system's decisions.

In some aspects, the neural network module 400 can include a learning module that updates the digital twin models based on the feedback from the fusion and output module 406. This learning module can use various machine learning algorithms, such as supervised learning, unsupervised learning, deep learning or reinforcement learning, to improve the accuracy and robustness of the digital twin models. In some cases, the neural network module 400 can also include a visualization module that generates graphical representations of the digital twin simulations and the well health status, providing a visual aid for the operators and the decision-makers.

Figure 5:
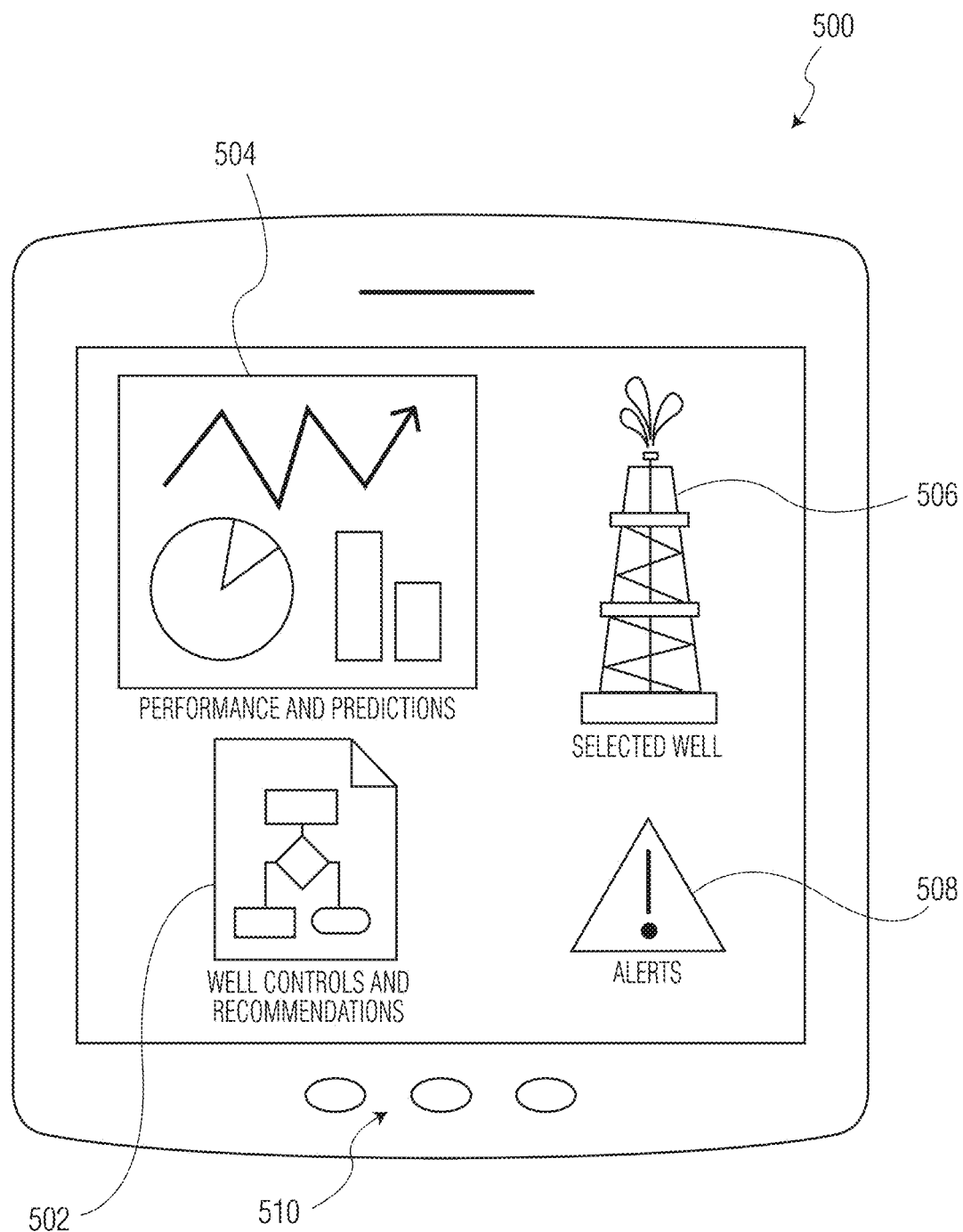
FIG. 5 illustrates a front view of an HMI display for an autonomous drilling system, according to aspects of the present disclosure.

Referring to FIG. 5, the diagram illustrates a front view of an HMI display 500 for an autonomous drilling system. The HMI display 500 provides a user-friendly interface for rig operators to monitor real-time data, receive AI output (i.e. recommendations and/or instructions), and manually intervene in the drilling process if desired. The layout of the HMI display 500 can be designed to provide a comprehensive overview of the drilling operation, enabling operators to maintain situational awareness and make informed decisions.

In the upper left quadrant of the HMI display 500, a performance chart 504 is shown. This chart includes graphical representations of various performance metrics and predictions generated by the AI agents and the digital twin models. The performance chart 504 can display information such as the drilling rate, the mud flow rate, the well pressure, and the cuttings volume. It can also display predictions for future drilling performance, such as the expected drilling rate, the optimal mud weight, or the estimated time to reach the target depth. The performance chart 504 allows operators to monitor the drilling performance in real-time and assess the accuracy of the AI predictions.

To the right of the performance chart 504, a well selection 506 section is depicted. This section allows operators to select the well that they want to monitor or control. The well selection 506 can include a list of wells, a map of the drilling site, or a search function to find a specific well. Once a well is selected, the HMI display 500 updates to show the real-time data, AI output (i.e. recommendations and/or instructions), and control options for the selected well. This feature allows operators to easily switch between different wells, which is particularly useful in multi-well drilling operations or drilling rigs with multiple drilling stations for redundancy, supervision or other activity performance management.

In the lower left quadrant of the HMI display 500, a well control, activity performance management, and recommendations section 502 is displayed. This section contains AI-generated recommendations for adjusting the drilling parameters, as well as control options for the operator to implement these recommendations. The recommendations can include suggested adjustments to the weight on bit, the rotation speed, the mud flow rate, choke adjustment, or the mud weight. The control options can include buttons, sliders, or input fields for the operator to adjust the drilling parameters manually. The well control, activity performance management and recommendations section 502 provides a direct interface for the operator to control the drilling operation based on the AI recommendations, enhancing the operator's control over the drilling process.

In the lower right quadrant of the HMI display 500, an alerts section 508 is shown. This section displays alerts or warnings about potential drilling hazards or well control events. The alerts can be generated by the AI agents based on the real-time data and the digital twin simulations. They can include warnings about potential kicks, losses, stuck pipe incidents, or equipment malfunctions. The alerts section 508 provides a visual indication of potential issues, allowing operators to respond promptly and take corrective actions.

At the bottom of the HMI display 500, a row of HMI buttons 510 is visible. These buttons provide quick access to various functions or settings of the autonomous drilling system. The buttons can include navigation buttons to switch between different screens or modes, control buttons to start or stop the drilling operation, and setting buttons to adjust the system settings or preferences. The HMI buttons 510 enhance the usability of the HMI display 500, providing a convenient and intuitive interface for the operators.

In some aspects, the HMI display 500 can include additional features or components to enhance its functionality. For example, it can include a data logging feature to record the real-time data, AI output (i.e. recommendations and/or instructions), and operator actions for later analysis or review. It can also include a help feature to provide guidance or instructions to the operators, or a diagnostic feature to troubleshoot any issues with the system. In some cases, the HMI display 500 can be customizable, allowing operators to configure the layout, the data displays, or the control options to suit their preferences or the specific requirements of the drilling operation.

To further illustrate the comprehensive operation of the autonomous drilling system, a detailed use case will be presented, incorporating steps from the flowcharts in FIG. 2A and FIG. 2B, and the devices shown in FIG. 3.

In this specific scenario, the autonomous drilling system is being used to drill a horizontal well in a shale formation with an extended horizontal section.

The process begins with system initialization step 222, where the operator powers on the autonomous drilling system through the rig controller 302A. The system performs self-diagnostics and sensor checks, ensuring that the components are functioning correctly. This can include verifying the calibration of the high-side pressure sensor PSH, VMH, low-side pressure sensor PSL, VML, and MWS.

Next, in the operator input stage step 224, the operator uses the rig HMI 302B to load the well construction plan. This plan specifies the target depth, the horizontal section, expected shale formation characteristics, and the planned wellbore trajectory including the kickoff point at a kickoff depth. This information can be transmitted via the cloud network 308 to the system models server 304A.

The data collection phase step 202 commences as drilling begins. The rig controller 302A gathers real-time data from the sensors. For example, the VMH measures an initial mud flow rate, while the MWS indicates a mud weight.

In the data preprocessing stage step 204, the system models server 304A cleans and formats this raw data. It can, for instance, filter out noise from the pressure sensor readings and calculate derived data points such as equivalent circulating density based on the mud weight and flow rate.

During the digital twin update phase step 206, the system models server 304A incorporates this preprocessed data into its digital twin framework, creating an up-to-date virtual representation of the well. This might include updating the simulated wellbore pressure profile based on the current mud weight and flow rate.

Real-time analysis and prediction step 208 can then be performed. For example, as the drill bit approaches the planned kickoff point, the AI agents might predict an increased risk of wellbore instability based on the formation characteristics and current drilling parameters.

In the integration of digital twin outputs step 210, the system control center 304C aggregates this information. It might determine that the well health is generally good, but that adjustments can be beneficial for the upcoming directional drilling phase.

During the real-time monitoring phase step 226, the operator observes on the rig HMI 302B that the rate of penetration in a number of feet per hour and that the parameters are within expected ranges as the well approaches the kickoff point.

In the decision-making stage step 212, as the well approaches the kickoff point, the system control center 304C recommends reducing the weight on bit and increasing the mud weight in preparation for the directional drilling phase.

In the parameter adjustment phase step 228, the operator reviews these recommendations/instructions on the rig HMI 302B and accepts them. The integrated rig control system, managed by the rig controller 302A, then autonomously implements these changes.

Throughout the drilling progress tracking stage step 230, the operator monitors the well's progress. As the well successfully kicks off and begins its horizontal section, the system control center 304C provides updates on the wellbore trajectory and formation characteristics.

If a well control event is detected, such as a sudden increase in gas levels in the returning mud as the horizontal section is drilled, the well control event management process step 232 is initiated. The system control center 304C might alert the operator and recommend increasing the bottom hole pressure by closing the choke and increasing the Surface Back Pressure (SBP). This automated process, part of the MPD or Well Control System, can provide a rapid response to the detected well control event. Alternatively, the system might suggest increasing the mud weight as a longer-term solution. The system's ability to consider both immediate and long-term solutions demonstrates its comprehensive approach to well control management.

The autonomous operation and human oversight phase step 214 continue as the horizontal section is drilled, with the system making continuous adjustments to optimize the drilling process while the operator maintains oversight.

A choke may also be controlled by the autonomous drilling system as part of its well control strategy. The system may continuously monitor downhole pressure, flow rates, and other relevant parameters through sensors like the VMH and VML. Based on this real-time data and predictions from the digital twin models, the AI agent module may recommend choke adjustments to maintain the desired bottomhole pressure, especially during operations like transitioning to the horizontal section. The integrated rig control system may then automatically adjust the choke position, while the operator can monitor these changes through the well control activity performance management and recommendations section 502 on the HMI display 500. In case of sudden pressure fluctuations or gas influx, the system may rapidly adjust the choke to prevent well control incidents, with the operator having the option to intervene manually if needed.

Upon reaching the target depth of the and horizontal section, and successfully tripping out of the well after conditioning the hole for the completion, the end of well completion process step 234 is initiated. The operator confirms completion through the rig HMI 302B, and the system models server 304A generates final reports detailing the well path, formation data, and drilling performance metrics.

In the continuous learning phase step 236, the operator provides feedback on the system's performance during the horizontal drilling phase. This feedback, along with the operational data from the successful well, is stored in the system historical database 304B to improve AI models for future horizontal shale wells.

Throughout this process, the cloud network 308 enables real-time communication between the components, while third party services 306, such as real-time geo-steering data providers, are integrated to enhance the system's decision-making capabilities during the horizontal drilling phase.

While the foregoing is directed to example embodiments described herein, other and further example embodiments can be devised without departing from the basic scope thereof. For example, aspects of the present disclosure can be implemented in hardware or software or a combination of hardware and software. One example embodiment described herein can be implemented as a program product for use with a computer system. The program(s) of the program product defines functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. An autonomous drilling system for well construction activities, comprising:
   a sealing system configured to seal a wellbore to pressurize a wellbore to facilitate a closed loop drilling configuration, and to unseal the wellbore to unpressurize the wellbore to facilitate an open loop drilling configuration:
   a data acquisition system configured to collect real-time data, the real-time data comprising:
      drilling parameters from a drilling controller, and
      sensor data from sensors comprising:
         flowrate sensors measuring an amount of fluid flowing through the drilling system, the flowrate sensors comprising a low-pressure flow meter configured to measure a flow rate of the fluid exiting the wellbore in both the open loop drilling configuration when the wellbore is unpressurized and the closed loop drilling configuration when the wellbore is pressurized, and
         pressure sensors measuring a pressure of the fluid flowing through the drilling system;
   a digital twin framework comprising a plurality of drilling models configured to:
      simulate drilling operations based on the collected real-time data comprising the flow rate of the fluid exiting the wellbore, and
      output predictions for the drilling operations based on the simulation;
   an artificial intelligence (AI) agent module configured to:
      perform an analysis of the autonomous drilling system by aggregating the predictions from the digital twin framework, and analyzing the real-time data,
      determine well health based on the analysis, the well health indicating a health of exposed portions of the wellbore after being drilled and prior to casing, and
      recommend adjustments to the drilling parameters;
   an integrated rig control system configured to automate the drilling operations based on the recommended adjustments to the drilling parameters; and
   a human-machine interface configured to provide manual control the drilling operations based on the recommended adjustments to the drilling parameters.

2. The autonomous drilling system of claim 1, wherein the flowrate sensors comprise a high-pressure flow meter measuring the flow of drilling fluid entering the wellbore.

3. The autonomous drilling system of claim 1, wherein the low-pressure flow meter is configured to measure mass flow rate of the drilling fluid in both the open loop and the closed loop drilling configurations.

4. The autonomous drilling system of claim 1, wherein the sensors further comprise downhole sensors comprising at least one of the pressure sensors, temperature sensors, and vibration sensors.

5. The autonomous drilling system of claim 1, wherein the digital twin framework comprises multiple digital twins, each simulating a specific aspect of a construction process of the wellbore.

6. The autonomous drilling system of claim 5, wherein the specific aspects simulated by the digital twins comprise at least one of drill string dynamics, cuttings circulation, wellbore geometry, and geological formations.

7. The autonomous drilling system of claim 1, wherein the AI agent module employs deep learning or reinforcement learning techniques.

8. The autonomous drilling system of claim 1, comprising cuttings sensors measuring physical characteristics of cuttings exiting the wellbore as a result of the drilling, wherein the cuttings sensors comprise a cutting weight sensor configured to analyze volume of the cuttings from the wellbore.

9. The autonomous drilling system of claim 8, wherein the AI agent module is further configured to use data from the cutting weight sensor to assess wellbore stability and hole cleaning efficiency.

10. The autonomous drilling system of claim 1, wherein the integrated rig control system is configured to transition between the open loop and the closed loop drilling operations based on output from the AI agent module.

11. A method for autonomous drilling for well construction activities, comprising:
    sealing, a sealing system a wellbore to pressurize a wellbore to facilitate a closed loop drilling configuration, and unsealing, by the sealing system, the wellbore to unpressurize the wellbore to facilitate an open loop drilling configuration:
    collecting, by a data acquisition system, real-time data comprising:
       drilling parameters from a drilling controller, and
       sensor data from sensors comprising:
          flowrate sensors measuring an amount of fluid flowing through a drilling system, the flowrate sensors comprising a low-pressure flow meter configured to measure a flow rate of the fluid exiting the wellbore in both the open loop drilling configuration when the wellbore is unpressurized and the closed loop drilling configuration when the wellbore is pressurized, and
          pressure sensors measuring a pressure of the fluid flowing through the drilling system;
    simulating, by a digital twin framework comprising a plurality of drilling models, drilling operations based on the collected real-time data comprising the flow rate of the fluid exiting the wellbore;
    outputting, by the digital twin framework, predictions for the drilling operations based on the simulation;
    analyzing, by an artificial intelligence (AI) agent module, the autonomous drilling by aggregating the predictions from the digital twin framework, and analyzing the real-time data;
    determining, by the AI agent module, well health and recommended adjustments to the drilling parameters the well health indicating a health of exposed portions of the wellbore after being drilled and prior to casing;
    automating the drilling operations, by an integrated rig control system, based on the recommended adjustments to the drilling parameters; and
    providing manual control of the drilling operations, by a human-machine interface, based on the recommended adjustments to the drilling parameters.

12. The method of claim 11, wherein the flowrate sensors comprise a high-pressure flow meter measuring the flow of drilling fluid entering the wellbore.

13. The method of claim 11, wherein the low-pressure flow meter measures mass flow rate of the drilling fluid in both the open loop and the closed loop drilling configurations.

14. The method of claim 11, wherein the sensors further comprise downhole sensors comprising at least one of the pressure sensors, temperature sensors, and vibration sensors.

15. The method of claim 11, wherein the digital twin framework comprises multiple digital twins, each simulating a specific aspect of a construction process of the wellbore.

16. The method of claim 15, wherein the specific aspects simulated by the digital twins comprise at least one of drill string dynamics, cuttings circulation, wellbore geometry, and geological formations.

17. The method of claim 11, wherein the AI agent module employs deep learning or reinforcement learning techniques.

18. The method of claim 11, comprising measuring, by a cuttings sensors, physical characteristics of cuttings exiting the wellbore as a result of the drilling, wherein the cuttings sensors comprise a cutting weight sensor configured to analyze volume of the cuttings from the wellbore.

19. The method of claim 18, further comprising using data from the cutting weight sensor to assess wellbore stability and hole cleaning efficiency by the AI agent module.

20. The method of claim 11, further comprising transitioning between the open loop and the closed loop drilling operations using the integrated rig control system based on output from the AI agent module.

* * * * *